(12) United States Patent
Hart et al.

(10) Patent No.: US 7,558,592 B2
(45) Date of Patent: Jul. 7, 2009

(54) RADIO PLANNING FOR WLANS

(75) Inventors: Brian Hart, Milpitas, CA (US); Bretton Lee Douglas, San Jose, CA (US); Lu Qian, Solon, OH (US)

(73) Assignee: Cisco Technology, Inc., San Jose, CA (US)

( * ) Notice: Subject to any disclaimer, the term of this patent is extended or adjusted under 35 U.S.C. 154(b) by 636 days.

(21) Appl. No.: 11/219,596

(22) Filed: Sep. 1, 2005

(65) Prior Publication Data

US 2007/0049319 A1 Mar. 1, 2007

(51) Int. Cl.
H04B 7/00 (2006.01)
H04Q 7/20 (2006.01)

(52) U.S. Cl. ........................ 455/522; 455/69; 455/452.2; 455/447

(58) Field of Classification Search .................. 455/446, 455/422.1, 522, 69, 447, 448, 452.1, 452.2, 455/67.11, 450, 515, 509; 370/338, 329, 370/254, 328

See application file for complete search history.

(56) References Cited

U.S. PATENT DOCUMENTS

| 6,023,459 | A | 2/2000 | Clark et al. ................. 370/329 |
| 6,178,328 | B1 | 1/2001 | Tang et al. .................. 455/447 |
| 6,317,599 | B1 | 11/2001 | Rappaport et al. .......... 455/446 |
| 6,499,006 | B1 | 12/2002 | Rappaport et al. ............ 703/20 |
| 6,625,454 | B1 | 9/2003 | Rappaport et al. .......... 455/446 |
| 7,248,836 | B2 * | 7/2007 | Taylor ...................... 455/67.11 |
| 2004/0143428 | A1 | 7/2004 | Rappaport et al. ............ 703/22 |
| 2005/0059405 | A1 * | 3/2005 | Thomson et al. ............ 455/446 |
| 2005/0190732 | A1 | 9/2005 | Douglas et al. ............. 370/338 |
| 2007/0286143 | A1 * | 12/2007 | Olson et al. ................. 370/338 |

FOREIGN PATENT DOCUMENTS

WO   WO 2005/018162 A1   2/2005

OTHER PUBLICATIONS

S. Zhou, M. Zhao, X. Xu, J. Wang and Y. Yao. "Distributed Wireless Communication System: A New Architecture for Future Public Wireless Access." *IEEE Communications Magazine*, vol. 41, Issue 3, Mar. 2003, pp. 108-111.

(Continued)

*Primary Examiner*—John J Lee
(74) *Attorney, Agent, or Firm*—Dov Rosenfeld; INVENTEK

(57) ABSTRACT

Described herein are a computer-implemented method of determining a power plan/frequency plan combination assigning transmit frequency channels and transmit powers for a plurality of managed access points (APs) of a wireless network. Also described herein is a carrier medium carrying computer readable code configured to cause one or more processors of a processing system to implement the computer implemented method of determining a power plan/frequency plan combination. The method includes determining candidate power plans for the access points, including determining candidate transmit powers for the access points, determining a candidate frequency plan corresponding to each of the determined candidate power plans using a frequency plan determining method to determine a set of candidate power plan/frequency plan combinations, and rating each combination of a candidate power plan and candidate frequency plan according to an evaluation criterion, and selecting a preliminary power plan/frequency plan combination based on the rating. One embodiment of the method further includes determining a final power plan for the preliminary frequency plan of the preliminary power plan/frequency plan combination to obtain a final power plan/frequency plan combination.

33 Claims, 17 Drawing Sheets

OTHER PUBLICATIONS

A. Doufexi, E. Tameh, A. Nix and S. Armour. "Hotspot Wireless LANs to Enhance the Performance of 3G and Beyond Cellular Networks." *IEEE Communications Magazine*, vol. 41, Issue 7, Jul. 2003, pp. 58-65.

I. Katzela and M. Naghshineh. "Channel Assignment Schemes for Cellular Mobile Telecommunication Systems: A Comprehensive Survey." *IEEE Personal Communications*, Jun. 1996, pp. 10-31.

G. Hampel, D. Abush-Magder, A. Diaz, L. Drabeck, M. Flanagan, J. Graybeal, J. Hobby, M. MacDonald, P. Polakos, J. Srinivasan, H. Trickey, L. Zhang, and G. Rittenhouse. "The New Paradigm for Wireless Network Optimization: A Synergy of Automated Processes and Human Intervention." *IEEE Communications Magazine*, vol. 43, Issue 3, Mar. 2005, pp. S14-S21.

A. Hills and B. Friday. "Radio Resource Management in Wireless LANs." *IEEE Communications Magazine*, vol. 42, Issue 12, Dec. 2004, pp. S9-S14.

A. Hills and J. Schlegel. "Rollabout: A Wireless Design Tool." *IEEE Communications Magazine*, vol. 42, Issue 2, Feb. 2004, pp. 132-138.

A. Hills. "Large-Scale Wireless LAN Design." *IEEE Communications Magazine*, vol. 39, Issue 11, Nov. 2001, pp. 98-104.

Scalable Networks Press Release, May 12, 2004, http://www.scalable-networks.com/new/press/pressreleases13.php.

Scalable Networks Product Description for Product announced on May 12, 2004 http://www.scalable-networks.com/products/qualnet_wifi.php.

LANPlanner® SE Product Brochure, Wireless Valley, 2404 Rutland Drive, Suite 700, Austin, Texas, 78758, Jan. 2004.

U.S. Appl. No. 11/102,509, titled "Radio Plan Generator," filed Apr. 8, 2005 to inventors Theobold et al. Not yet published.

U.S. Appl. No. 10/933,102, titled "Rapid Search for Optimal Wireless Network Configuration," filed Sep. 2, 2004 to inventors Douglas et al. Not yet published.

U.S. Appl. No. 10/183,704, titled "Method and System for Dynamically Assigning Channels Across Multiple Radios in a WLAN," filed Jun. 25, 2002 to inventors Friday et al. Not yet published.

U.S. Appl. No. 10/409,246, titled "Method and System for Dynamically Assigning Network Resources in a Wireless Network," filed Apr. 7, 2003 to inventors Friday et al. Not yet published.

U.S. Appl. No. 10/913,561, titled "Method and System for Dynamically Assigning Channels Across Multiple Radios in a Wireless LAN," filed Aug. 6, 2004 to inventors Friday et al. Not yet published.

\* cited by examiner

// The following is an initialization only; the actual primary AP will change later For each selected AP, find the walkabout points for which the selected AP is the nearest managed AP (nearest in terms of pathloss). These are the client walkabout points for the AP.

// 203 of FIG. 2: Find one power plan per PHY data rate, minus duplicates

Initialize the set of power plans denoted tx_power_dBm, to empty for i = 1 to number of data rates (4 for 802.11b, 10 for 802.11bg) (we ignore the 2 and 5.5Mbps rates), or 8 for 802.11a)

Initialize an array size 1-by-num_managed_ap denoted tx_power_dBm_current with a set of AP powers in dBm for j = each managed AP denoted AP(j), Find the minimum power setting of AP(j) such that all of AP(j)'s walkabout points' RSSIs exceed the required RSSI for data_rate(i). If that isn't possible, choose AP(j)'s maximum power setting instead. Store this as tx_power_dBm_current(j)

Append this new power plan tx_power_dBm_current to tx_power_dBm, if it is not already present // At this point, we have up to 4 power plans for 802.11b, up to 10 for 802.11bg, or up to 8 for 802.11a. We may have fewer: e.g. in a sparse deployment, the power plans for the 36 Mbps, 48 Mbps and 54 Mbps rates may all be the same because all APs are at their max power.

FIG. 3A

// 205 of FIG 2: For each power plan get a frequency plan

Set `num_pow` = number of power plans

Initialize a set of frequency plans, channel, to empty

// Sweep over the power plans. Each power plan is denoted by an index n.

for n = 1 to `num_pow`

Given the power plan `tx_power_dBm(n)`, calculate a frequency plan `channel(n)` so that `tx_power_dBm(n)` and `channel(n)` form a candidate frequency/power plan.

`channel(n)` is calculated by determining a frequency plan, the plan determining taking AP-to-AP interactions, but not AP-to-walkabout point interactions into account. The frequency plan determining includes assigning frequency channels for more than one AP in parallel.

// Note that each `channel(n)` is a 1 x `num_managed_ap` array of channel indices (e.g. [1 1 6 11 1])

FIG. 3B

// 207 of FIG. 2: Choose the best (preliminary) frequency/power plan based on the combined metric Initialize a (1 by num_pow) array, denoted cm_array to hold combined metrics (CMs)

Calculate the combined metric for channel(i) and tx_power_dBm(i), and store the metric in cm_array(i)

Find the i at which cm_array(i) is maximum, and denote this i value as prelim_best_i Output channel_best = channel(prelim_best_i) and
tx_power_dBm_prelim_best = tx_power_dBm(prelim_best_i) as the preliminary frequency/power plan

FIG. 3C

// 209 of FIG. 2: Refine the preliminary frequency/power plan to get the final frequency/power plan Perform a final fine power sweep on channel_best and tx_power_dBm_prelim_best to get tx_power_dBm_best. // Note that channel_best is unchanged Output channel_best and tx_power_dBm_best as the final frequency/power plan

FIG. 3D

RADIO PLANNING FOR WLANS

RELATED PATENT APPLICATIONS

The present invention is related to U.S. patent application Ser. No. 11/102,509 to inventors Theobold, et al., filed Apr. 8, 2005, assigned to the assignee of the present invention, and titled RADIO PLAN GENERATOR the contents of which are incorporated herein by reference for all purposes.

The present invention is also related to the subject matter of U.S. application Ser. No. 10/933,102 to inventors Douglas, et al., filed on Sep. 21, 2004, assigned to the assignee of the present invention, and titled RAPID SEARCH FOR OPTIMAL NETWORK CONFIGURATION, the contents of which are herein incorporated by reference in their entirety for all purposes.

The present application is also related to the subject matter of U.S. application Ser. No. 10/791,466 to inventors Douglas, et al., filed on Mar. 1, 2004, assigned to the assignee of the present invention, and titled QUALITY EVALUATION FOR WIRELESS COMMUNICATION NETWORKS, the contents of which are herein incorporated by reference in their entirety for all purposes.

BACKGROUND

The present invention is related to wireless networks, and in particular to radio plan generation to determine transmit frequencies and transmit powers in a wireless local area network (WLAN).

Radio plan generation for wireless local area networks, including the selection of a frequency channel, sometimes antenna configuration, and a transmit power level for each of a potentially large number of access points (APs), is an integral radio management function of a WLAN system. Current technology successfully manages in the order of 10's of APs, developing the radio plan in a timely fashion. Consider, for example, an IEEE 802.11b network that includes 10 typical access points. Each access point can be assigned to one of three possible channels and one of six possible power levels. Thus each access point has 18 possible configurations. This network would therefore have $18^{10}$ or approximately 3.6 trillion possible configurations. An exhaustive search of each possible configuration would take an extremely long time considering that some sort of quality metric must be evaluated for each considered configuration. Thus there is a need in the art for a radio plan generator that can deliver high quality plans, but in a faster and more scalable way than at present.

Furthermore, the number of APs to be managed is likely to grow significantly in the future, as could be the case in the deployment of a high-density enterprise system. It is desirable to have a technique that scales more directly to the number of APs.

Timeliness of frequency assignment is also a strong driver for implementation of dynamic frequency assignment standards, such as the IEEE 802.11h standard, wherein mandated frequency changes can drive reassignment of large groups of APs. This must be done on the fly, with as little impact as possible on network throughput. Speed of reassignment becomes a key factor, especially when a large number of APs is involved.

Radio planning is known for cellular telephones, in particular, for so-called second generation (2G) cellular telephony. Many methods are known for frequency allocation for 2G cellular telephony. See for example, I. Katzela, N. Naghshineh; Channel assignment schemes for cellular mobile telecommunication systems: a comprehensive survey; IEEE Personal Communications (June '96).

See also, U.S. Pat. No. 6,023,459 to Clark et al., and U.S. Pat. No. 6,178,328 to Tang, et al. These methods assign frequency channel, but do not simultaneously assign transmit power.

In 2G cellular telephony, devices in each cell transmit without regard to who is transmitting in other cells. Communication is still reliable as long as the desired signal power is sufficiently far above the total interference power from all the other devices on the same channel. Therefore, in 2G systems, every effort is made to reduce the interference power. As a first step, channels are not reused until distant cells are available for such channels. This can be expressed as a graph coloring problem, where colors represent frequencies, and according to which physically adjacent (or more generally, nearly adjacent) regions have to be colored differently.

WLANs have much smaller cells than 2G systems, and hence achieve much higher per-user data rates. In exchange, WLANs cannot rely on regular cells, nor can the tricks of 2G engineers make up the difference. Walls, windows, doors, partitions, ceilings, and even filing cabinets can lead to anomalous propagation and non-uniform or overlapping cells.

For this and other reasons, WLANs re-define when devices are allowed to transmit. Instead of transmitting without regard to transmissions in other cells, 802.11 WLAN devices determine if the shared wireless medium is quiet and only transmit when this is so.

For example, for 2G systems, a frequency plan with adjacent co-channel APs is fatally poor. Handsets can transmit at the same time, and when they do, they create interference for one another so that the base-station cannot recover their data.

WLANs should ideally minimize the number of interfering devices, especially co-channel APs, that can detect each other, not the total interference power.

In summary, intuitive heuristics, developed from such fields as 2G cellular telephony, may be misleading when applied to WLANs. That is, the closest distance between two co-channel APs is less important than the total number of interfering APs.

Co-assigned above-mentioned incorporated-herein-by-reference U.S. patent application Ser. No. 10/933,102 titled RAPID SEARCH FOR OPTIMAL NETWORK CONFIGURATION provides a search algorithm to find a globally optimal radio plan for a wireless network, including assignments of frequency and transmit power to multiple access points. Two different evaluation metrics are used in order to provide an optimal solution in a reasonable time period. Frequency searches are performed using a special rapid evaluation metric, called the Fast Evaluation Metric (FEM). Given a set of frequency assignment for a set of APs, and path losses between the pairs of APs, the fast evaluation metric (FEM) counts the number of pairs of access points that contend on the same frequency. A lower value indicates a higher quality. Transmit powers are selected using a more refined metric called the Combined Metric (CM) that estimates data throughput. The search results are deterministic and execution time is also substantially deterministic.

The CM has been previously described in above-mentioned incorporated-herein-by-reference U.S. patent application Ser. No. 10/791,466 titled QUALITY EVALUATION FOR WIRELESS COMMUNICATION NETWORKS. The CM considers factors such as contention and collision among access points and client locations, traffic load, the physical space to be covered, etc. The input to the combined metric includes path losses between the access points as well as the frequency and power settings of the access points. The CM requires sufficient computation time that it is not feasible to evaluate it for every possible solution even for a relatively small number of access points.

A first method disclosed in U.S. patent application Ser. No. 10/933,102 includes evaluating the FEM for a first subset of possible frequency assignments to a plurality of access points. The first method further includes, for a plurality of frequency assignments ranked best in FEM, evaluating the CM for all possible assignments of transmit power. The first method further includes identifying a mean transmit power for a plurality of transmit powers ranked best in terms of the evaluated CM. Based on the mean transmit power, the method includes evaluating the FEM for a second subset of possible frequency assignments, the second subset being larger than the first subset; and for a plurality of frequency assignments of this second subset ranked best in FEM, evaluating the CM for all possible assignments of transmit power.

A second method disclosed in U.S. patent application Ser. No. 10/933,102 is a method of assessing communication quality in a wireless network that includes a plurality of access points. The method includes: accepting path loss information indicating path losses among pairs of access points and frequency assignments for the access points, determining for each pair of access points the likelihood of contention based on path loss between the pair and whether they share a common frequency assignment, and counting the number of contending pairs of access points to determine a quality evaluation metric for the wireless network.

A third method disclosed in U.S. patent application Ser. No. 10/933,102 is a method for assigning transmit frequencies and transmit power levels to the APs. The third method includes: applying a first evaluation metric to reduce the solution space of power and frequency assignments and applying a second evaluation metric to find a best set of power and frequency assignments.

In one form, U.S. patent application Ser. No. 10/933,102 discloses a radio planning method that includes a series of sweeps: initial coarse frequency sweep, initial coarse power sweep, final coarse frequency sweep, final coarse power sweep, and final coarse power sweep to determine an optimal radio plan assigning both transmit frequencies and transmit power levels. The initial frequency/power sweep finds a reasonably optimal global AP power setting so that the final frequency/power sweep can concentrate on good frequency plans. A few of the best survivors are taken into a final fine power sweep, with the overall best result being reported to the user.

However, the frequency sweeps include "uniformly sampling" the possible frequency plans and may spend much of their time on poor frequency plans. Moreover there are two coarse power sweeps, and a fine power sweep applied to a few survivor solutions, and these all use the CM which is computationally intense. These aspects mean that there are situations in which the U.S. patent application Ser. No. 10/933,102 method may take minutes or hours to execute, and so it is desired to speed the algorithm up, and/or provide a quick, reasonably optimal, solution, e.g. for demonstration purposes.

Thus there is still a need in the art for a method and system and software to determine a radio plan for a WLAN in a relatively straightforward and rapid fashion. In particular, there is a need for radio planner that uses a direct frequency planner instead of uniformly sampling, so as to spend more time on good frequency plans.

Furthermore, there is a need in the art for a method that provides a good-enough, reasonably optimal radio plan solution that can be presented quickly to users.

SUMMARY

Described herein are a method, a system, and a carrier medium, e.g., software product on a medium carrying computer readable code, e.g., a software program to generate a radio plan for a wireless network such as a WLAN.

One aspect of a radio planning method embodiment of the present invention is using a direct method to determine frequency plans in the overall planning method, avoiding sampling plans, so as to spend more time on good frequency plans and avoid spending time on inferior plans. Another aspect of a radio planning method embodiment of the present invention is including only one coarse power sweep in the overall planning method. Another aspect of a radio planning method embodiment of the present invention, is subjecting only one survivor to a final fine power sweep in the overall planning method, in order to minimize the number of calculations of computationally expensive metrics such as the CM.

One aspect of the present invention is providing a method that determines a good-enough, early radio plan solution that can be presented quickly to users.

Described herein are a computer-implemented method of determining a power plan/frequency plan combination assigning transmit frequency channels and transmit powers for a plurality of managed access points (APs) of a wireless network. Also described herein is a carrier medium carrying computer readable code configured to cause one or more processors of a processing system to implement the computer implemented method of determining a power plan/frequency plan combination. The method includes determining candidate power plans for the access points, including determining candidate transmit powers for the access points, determining a candidate frequency plan corresponding to each of the determined candidate power plans using a first frequency plan determining method to determine a set of candidate power plan/frequency plan combinations, and rating each combination of a candidate power plan and candidate frequency plan according to a first evaluation criterion, and selecting a preliminary power plan/frequency plan combination based on the rating. One embodiment of the method further includes determining a final power plan for the preliminary frequency plan of the preliminary power plan/frequency plan combination to obtain a final power plan/frequency plan combination.

BRIEF DESCRIPTION OF THE DRAWINGS

FIGS. 3A, 3B, 3C, and 3D show pseudocode that described the method of the flowchart of FIG. 2 in more detail.

FIG. 12 depicts how the cell loading factor varies as the number of client locations increases, according to an aspect of the present invention.

DETAILED DESCRIPTION

Described herein are a method, a system, and a carrier medium, e.g., software product on a medium carrying computer readable code, e.g., a software program to generate a radio plan for a wireless network such as a WLAN.

The present invention will be described with reference to a representative wireless network that substantially conforms to the IEEE 802.11 standard such as, e.g., 802.11a, 802.11b, 802.11g, or currently envisioned standards such as 802.11n. By substantially conforming we mean compatible with. The reader of this description is assumed to have access to the documents defining these standards, and all of the documents defining these standards are incorporated herein by reference in their entirety for all purposes. In the example discussed herein, a region to be covered by a wireless network is divided into cells with each cell having an access point (AP). Client locations are associated with a particular access point and can communicate to and from the network via that access point.

Figure 1:
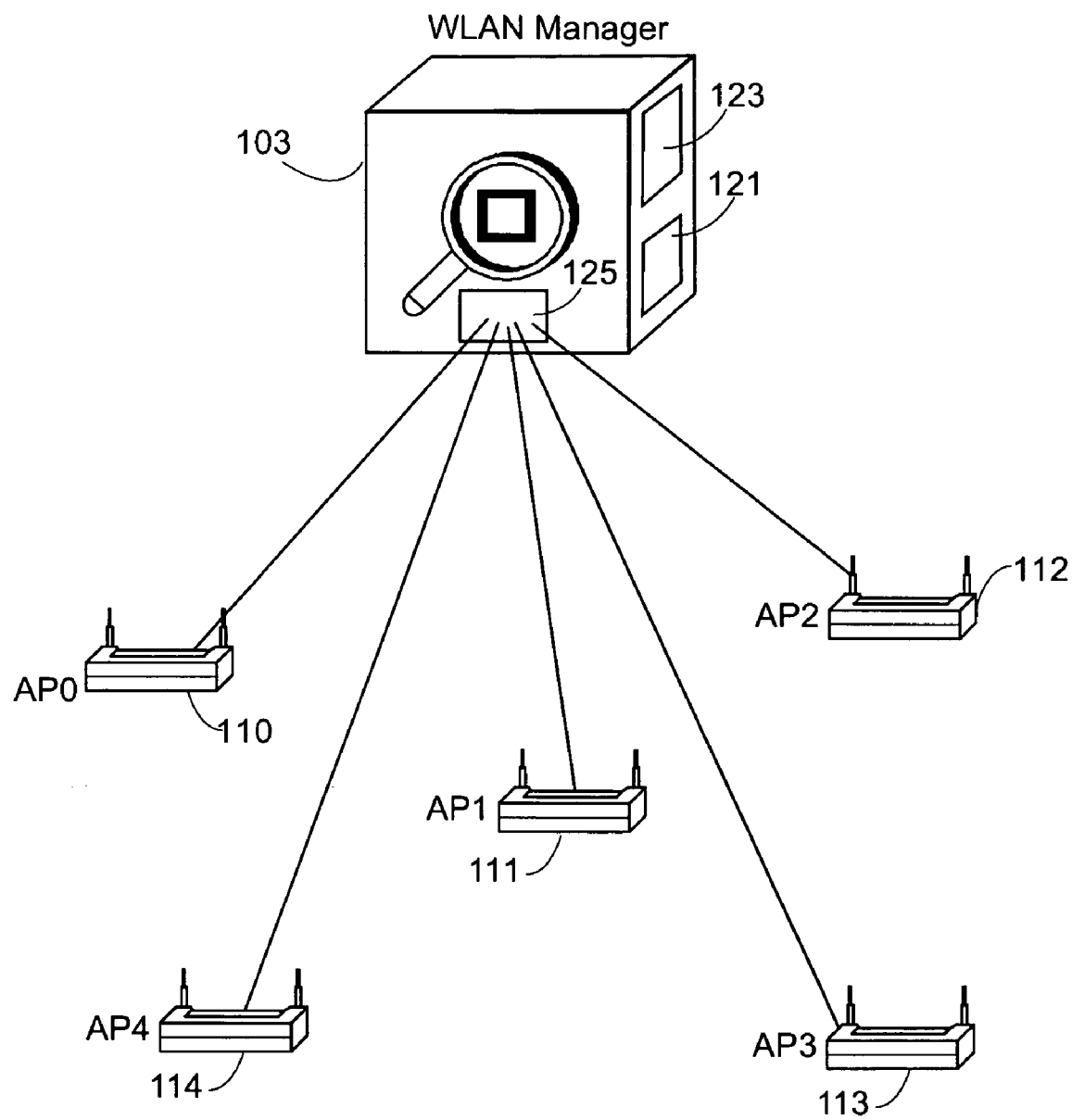
FIG. 1 shows one example of a network in which the present invention operates, including a management entity called the WLAN manager.

FIG. 1 depicts a representative wireless communications network 100 to which embodiments of the present invention may be applied. There are five access points: AP0 (110), AP1 (111), AP2 (112), AP3 (113) and AP4 (114). Each AP may have numerous associated client locations (not shown). In one embodiment, each of the APs is part of a managed wireless network, and is a managed AP in the sense that each AP is in communication with a management entity of a managed wireless network.

Depending on the size and complexity, a managed network is either a set of APs with a central control entity, or a hierarchical structure with a set of hierarchical control domains that eventually are coupled to a set of APs. Each control domain is managed by a management entity we call a manager herein. The number of levels in the hierarchy depends on the complexity and/or size of the network, and thus not all managed networks have all levels of control. For example, a simple managed network may only have one level of control with a single management entity controlling all the APs. Factors that influence the selection of control domains include one or more of: the various types of IP subnet configurations; the radio proximity of the access points; the client location sta-tion roaming patterns; the real time roaming requirements; and the physical constraints of the network (e.g., campus, building, and so forth).

In one embodiment, a managed AP has several properties, including the ability to accurately measure its received power level, called the radio signal strength indication (RSSI) herein. Managed access points furthermore transmit at known transmit powers. A managed AP also has the ability to receive instructions from the WLAN manager to set its transmit power and the transmit frequency in the form of a channel number according to the received instruction.

Some aspects of the IEEE 802.11 standard are modified slightly to accommodate some management aspects of the managed APs. For more information on radio management, see U.S. patent application Ser. No. 10/766,174 file Jan. 28, 2004 to inventors Olson, et al., titled A METHOD, APPARATUS, AND SOFTWARE PRODUCT FOR DETECTING ROGUE ACCESS POINTS IN A WIRELESS NETWORK, assigned to the assignee of the present invention, and incorporated herein by reference.

In this description, a single management entity called the WLAN Manager is assumed. The WLAN Manager manages several aspects of the wireless network, including, in one embodiment, generating the radio plan including assigning the transmit powers and the transmit channels for each of the APs.

In one embodiment, the WLAN manager authorizes the set of managed access points in the network, including maintaining a database called the Configuration Database that contains configuration parameters. The Configuration Database also includes an AP database that includes information on the managed APs, e.g., a list of the managed APs together with some data related to these APs, such as the location of the APs and the power the APs are able to transmit at. The WLAN Manager provides centralized control of various aspects of the radio environment within a given set of APs, including performing measurements to obtain path losses, and, according to an aspect of the invention, to determine the radio plan including network wide radio parameters such as transmit powers and channels during initial network deployment and network expansion.

One aspect of the present invention includes the WLAN manager having path loss information on the path loss between the managed APs. In one embodiment, the path loss information is obtained by one or more walkabouts, while in another, the path loss information is obtained by performing path loss measurements automatically between the APs as described in above mentioned U.S. patent application Ser. No. 10/766,174 and in U.S. patent application Ser. No. 10/629,384 titled "RADIOLOCATION USING A PATH LOSS DATA," filed Jan. 28, 2004 to inventors Kaiser, et al., assigned to the assignee of the present invention, and incorporated herein by reference.

Note that the invention does not require there to be a single WLAN Manager entity. The functionality described herein may be incorporated into any other management entities, e.g., at a local level, or by a separate manager called the Radio Manager that controls the radio aspects of the WLAN. Furthermore, any of these management entities may be combined with other functionalities, e.g., switching, routing, and so forth.

Returning now to FIG. 1, a simple managed network is shown. All management functions, including radio plan generation, are assumed incorporated into a single management entity—a WLAN Manager 103—that has access to the AP Database.

In one embodiment, the WLAN manager 103 that includes a processing system 123 with one or more processors and a memory 121. The memory 121 includes instructions that cause one or more processors of the processing system 123 to implement the radio plan generation described herein. The WLAN manager 103 includes a network interface 125 for coupling to a network, typically wired or otherwise connected. In one embodiment, the WLAN manager is part of a network switch and operated under a network operating system, in this case IOS (Cisco Systems, Inc., San Jose, Calif.).

The WLAN Manager 103 is coupled via its network interface 125 and a network (typically a wired network) to the set of managed APs: AP0, . . . , AP4 with reference numerals 110, . . . , 114, respectively.

Development of a radio plan for this network 100 of FIG. 1 includes assigning a frequency in the form of a transmission channel, and of transmit power to each access point. For example, in an 802.11b or 802.11g network, there may be three channels used, 1, 6, and 11. Each of the access points in network 100 will be assigned one of channels 1, 6, or 11. Others schemes employ four channels, such as 1, 4, 7, and 11 or 1, 4, 8, and 11. In one embodiment, there may be six different transmit power levels, for example, ranging from 0 dBm to 20 dBm for 802.11b access points and from 0 dBm to 15 dBm for 802.11a/g access points.

Figure 2:
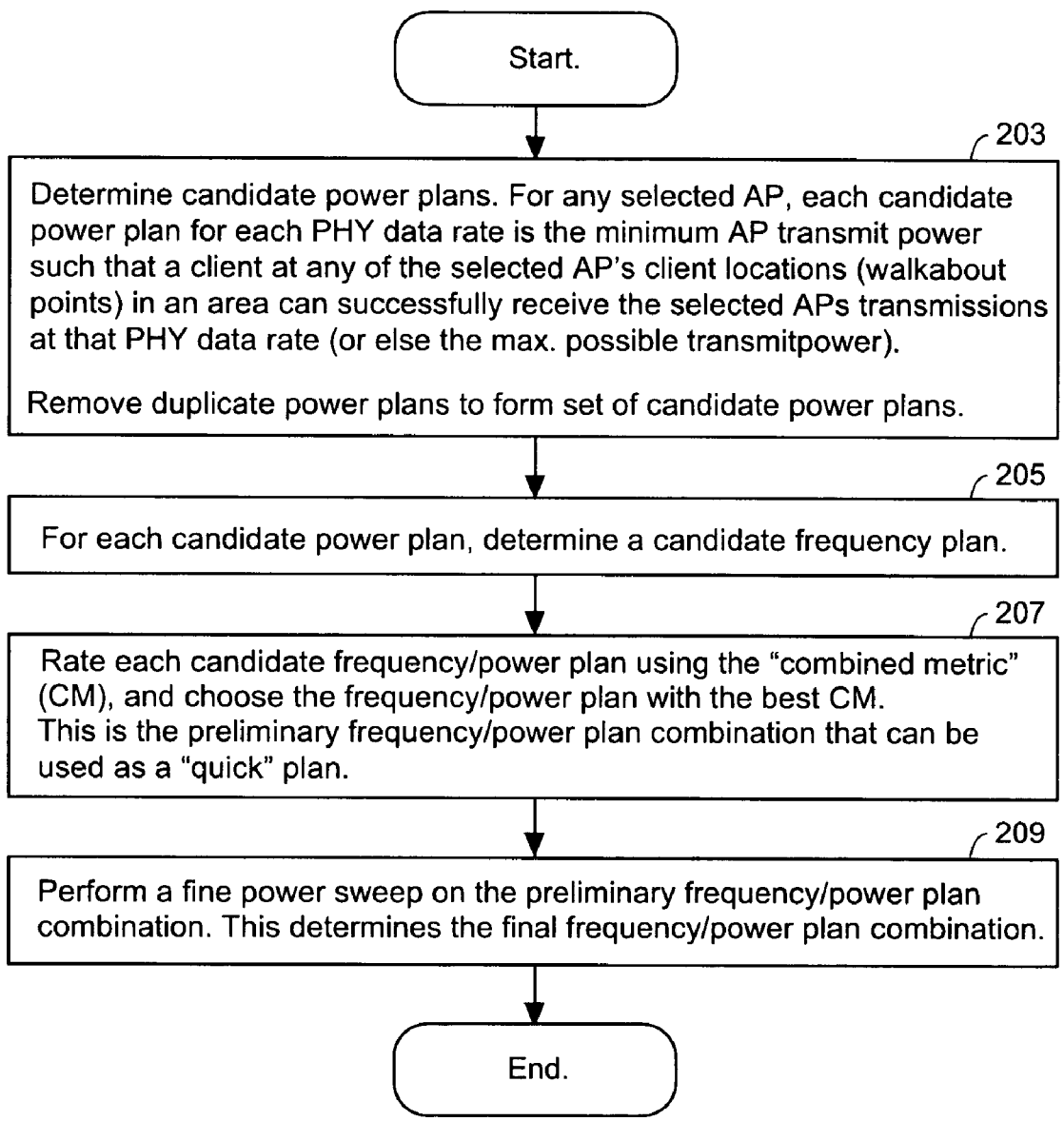
FIG. 2 shows a flowchart of the top level of a computer implemented method embodiment of the present invention to determine a power plan and frequency plan.

FIG. 2 shows a flowchart of the top level of a computer implemented method embodiment of the present invention to determine a power plan and frequency plan combination assigning transmit frequency channels and transmit powers for a plurality of access points of a wireless network. The method includes, in 203, determining candidate power plans for the access points to determine candidate transmit powers, and determining a candidate frequency plan corresponding to each of the determined candidate power plans using a frequency plan determining method to determine a set of candidate power plan and candidate frequency plan combinations. The method further includes rating each combination of a candidate power plan and candidate frequency plan according to a first evaluation criterion, and selecting a preliminary power plan/frequency plan combination based on the rating.

In one embodiment, the first evaluation criterion takes into account both AP-to-AP interactions and AP-to-client location-at-different-locations interactions. In one version, the possible client locations are represented by a set of walkabout points in an area. Furthermore, in one embodiment, the frequency plan determining method takes into account AP-to-AP interactions and does not take into account AP-to-client location-at-different-locations interactions, the client locations being at client locations in the area, e.g., a set of walkabout points.

In one embodiment, the determining in 203 of the candidate transmit power plan for a selected access point includes, for each PHY data rate, setting the candidate transmit power to be the minimum AP transmit power such that a client location at any of the selected AP's client locations in the area can successfully receive the selected APs transmissions at that PHY rate. In one embodiment, the possible client locations are represented by a set of walkabout points in an area. If no such successful reception is possible at all walkabout points, the candidate transmit power of the power plan for the selected AP is set to be the maximum transmit power setting of the selected AP.

In one embodiment, the method further includes refining the preliminary power plan of the preliminary power plan and frequency plan combination to obtain a final power plan and frequency plan combination.

The inventors have discovered that this quick plan, while not the best, is typically "good enough." For example, it typically yields a solution that is 92% as good as an implementation of the method described in U.S. application Ser. No. 10/933,102 while determining the plan approximately 100 times faster, and yields a solution that is 98% as good as the one in U.S. application Ser. No. 10/933,102 while determining the plan approximately 10 times faster. When a quick plan is needed, e.g., for demonstration purposes, one can use the quick plan which determines the plan at 100 times the speed of the one in U.S. application Ser. No. 10/933,102.

The motivation for the inventors developing the method was as follows. One method to speed up calculation is to consider AP-to-AP interactions only—that is, to ignore AP to client location-at-different-locations (client location-at-walkabout-point) interactions. However, considering only AP-to-AP interactions is contra-indicated when applied to AP power control because while the APs' transmit powers may be reduced to avoid co-channel problems, this would be done without recognizing that the data rate for transmissions to walkabout points would also fall as a result of transmit power reduction. This might lead to a worse plan overall. Hence, one aspect of the invention is to consider only AP-AP interactions for the frequency planning step 205. Because a good frequency plan requires a reasonably good power plan beforehand, the inventors selected a "frequency-blind" technique for the power planning step 203 prior to the frequency planning step 205. The technique of finding the minimum AP power to guarantee a given PHY data rate at all walkabout points, i.e., step 203, is intuitively satisfying and has led to good results. We have found this to be especially the case for AP deployments with non-uniform AP densities compared to the U.S. application Ser. No. 10/933,102 method in which coarse power sweeps can only choose a transmit power for the average power.

Because in one embodiment, carrying out 203 and 205 of the method 200 does not lead to knowledge of which data rate is optimal—such data rate knowledge depends on many complicated factors—an implementation of the present invention tries all data rates, as in step 205, then uses a metric such as the CM to determine the best plan, that is, step 207. The metric selected for use in step 207 is one that takes AP-AP and AP-walkabout point interactions into account. The CM is one such metric, while FEM, or typical metrics used in graph coloring only consider AP-AP interactions.

The additional block, shown in 209, carries out a fine power sweep to fine-tune the chosen power plan (the preliminary power plan), to work with the quick frequency plan.

FIGS. 3A, 3B, 3C, and 3D show pseudocode that describes the method of the flowchart of FIG. 2 in more detail.

Referring first to FIG. 3A, the method includes, for each AP, finding the walkabout points for which the selected AP is the nearest managed AP in a path loss sense. Note that this is an initialization only; the actual primary may change later in the method.

Block 203 in the flow chart of FIG. 2 includes finding one candidate power plan per PHY data rate, and removing any duplicates to form the set of candidate power plans. Denote the set of candidate power plans by tx_power_dBm. Initialize tx_power_dBm, to empty. Denote each data rate by i. In one embodiment, no candidate power plans are determined for the 2 Mbps and 5.5 Mbps rates for 802.11bg. Thus, candidate power plans are determined for 4 data rates for 802.11b, 10 for 802.11bg and 8 for 802.11a. For each data rate, the set of AP transmit powers is determined as a 1 by num_managed_ap array denoted tx_power_dBm_current, of AP powers in dBm, where num_managed_ap is the number of managed APs for which a plan is being determined. Denote by different values of an index j the different managed APs. For each AP j, the method includes finding the minimum power setting of AP j such that the detected RSSI at a station located at each walkabout point for AP j exceeds the required minimum RSSI for the data_rate denoted by index i. Note that we say that there is "successful reception" when the RSSI at a location is above the required minimum RSSI for the data rate. Conversely, we say that successful reception is not possible when the RSSI at a location is below the required minimum RSSI for the data rate. In the transmit power setting, if successful reception is not possible at all walkabout points, e.g., there is no power such that all of the walkabout points receive more than the required minimum RSSI for communication at the data rate, the method chooses for AP j its maximum power setting.

The resulting transmit power for AP j at data rate index i are stored in the candidate power plan tx_power_dBm_current as tx_power_dBm_current(j).

This new candidate power plan tx_power_dBm_current for the data rate i is appended to tx_power_dBm, if such a power plan is not already present. This is carried out for each data rate i.

At the end of the initial power plan process, there are up to 4 candidate power plans for 802.11b, up to 10 candidate power plans for 802.11bg, or up to 8 candidate power plans for 802.11a. Note that there may be fewer candidate power plans. For example, in a sparse deployment, the candidate power plans for the 36, 48 and 54 Mbps rates may all be the same because all APs are at their maximum power. Checking and removing duplicates ensures that only distinct candidate power plans are present.

FIG. 3B shows pseudocode for block 205 of FIG. 2 that includes determining a candidate frequency plan for each candidate power plan. The quantity num_pow is initialized with the number of candidate power plans. A set of frequency plans, denoted channel, is initialized to empty.

The determining of a candidate frequency plan or plans is carried out for each power plan, each such candidate power plan denoted by an index n. Therefore, determining the candidate frequency plans includes, for n=1 to num_pow, for the candidate power plan tx_power_dBm(n), determining the corresponding candidate frequency plan channel(n) so that tx_power_dBm(n) and channel(n) form a candidate frequency/power plan combination. Each channel(n) is a 1×num_managed_ap array of channel indices, e.g., [1 1 6 11 1].

In one embodiment, to speed up calculation, the determining of the candidate frequency plan or plans takes AP-to-AP interactions into account, but not AP-to-walkabout point interactions into account. One version of 205 includes determining frequency plans for a plurality of APs in parallel.

FIG. 3C shows pseudocode for block 207 of FIG. 2 that includes determining a preliminary frequency/power plan based on the CM.

In one embodiment, this includes initializing a 1 by num_pow array denoted cm_array to hold CMs, calculating the combined metric for each channel(n) and tx_power_dBm(n) candidate plan combination, and storing the calculated metric in cm_array(n).

Once CMs are calculated, block 207 includes determining the i at which cm_array(i) is maximum, and denoting this i by prelim_best_i. Thus channel(prelim_best_i) denoted channel_best and tx_power_dBm(prelim_best_i) denoted tx_power_dBm(prelim_best_i) is the preliminary frequency/power plan.

FIG. 3D shows pseudocode for block 209 of FIG. 2 that includes refining the preliminary frequency/power plan to determine the final frequency/power plan. The frequency plan channel_best remains unchanged. The method includes performing a final fine power sweep on channel_best and tx_power_dBm_prelim_best to determine the final power plan denoted tx_power_dBm_best. Then channel_best and tx_power_dBm_best form the final frequency/power plan combination.

Detailed Example of Determining Candidate Power Plans for the PHY Data Rates of the APs.

Block 203 of FIG. 2 includes accepting the path losses for each AP at a set of walkabout points. Additional information used includes the minimum RSSI at a station for reception.

One embodiment of the method 203 of determining the candidate power plans includes accepting a set of path losses for each AP indicative of the path loss from the AP to each of a set of locations (the walkabout points) in the area. The method further includes determining for each walkabout point which of the APs is the primary AP for the walkabout point. This also determines for each AP which are its walkabout points. The method further includes using the path loss data to determine the maximum path loss from each AP to any of that AP's walkabout points. The method further includes, for each data rate, accepting data indicative of the minimum signal strength at any station for successfully receiving data at the data rate. Such indicative data is then used to determine, for each data rate, and for each AP at that data rate, the minimum transmit power necessary for the AP to successfully communicate with client locations at all of the AP's walkabout points. This determines a set of potential power plans. The method further includes removing duplicates from the potential candidate power plans to determine the candidate power plans.

The method will be illustrated by means of a simple example of two APs, e.g., AP0 and AP1 of FIG. 1 inside a 3×4 array of walkabout points. Suppose the path losses from AP0 to the walkabout points is:

| AP0 to walkabout point | | | |
|---|---|---|---|
| 100 | 85 | 90 | 200 |
| 80 | 40 | 70 | 110 |
| 90 | 60 | 80 | 200 |

Further, Suppose the path losses from AP1 to the walkabout points are:

| AP1 to walkabout point | | | |
|---|---|---|---|
| 200 | 83 | 63 | 93 |
| 200 | 73 | 43 | 83 |
| 200 | 93 | 88 | 103 |

Thus, the closest AP of each walkabout point is as follows:

| AP for walkabout point | | | |
|---|---|---|---|
| AP0 | AP1 | AP1 | AP1 |
| AP0 | AP0 | AP1 | AP1 |
| AP0 | AP0 | AP0 | AP1 |

The above table describes which walkabout points correspond to which AP (each AP has 6 corresponding walkabout points).

From the above, we can see that the maximum path loss from any walkabout point to its primary AP is 100 dB for AP0 and 103 dB for AP1.

In the 802.11b case, assume that each station needs at minimum

[−92 dBm −86 dBm −84 dBm −77 dBm]

to receive at 1, 2, 5.5 and 11 Mbps respectively. Assume furthermore, for the sake of simplicity in this example, that each AP can transmit at 10 or 20 dBm.

For each of the 1, 2, 5.5 and 11 Mbps, we determine what transmit powers are needed to successfully communicate between each AP and each of its walkabout points. We start by attempting to provide 1 Mbps everywhere using the minimum transmit power (10 dBm). Since 10 dBm−100 dB>−92 dBm, AP0 can transmit at 10 dBm. However 10 dBm−103 dB≦−92 dBm, so AP1 must transmit at 20 dBm to reach all of its walkabout points at 1 Mbps. Working through the other data rates leads to Table 1 below that provides the minimum AP transmit power such that all the APs (AP0 and AP1) can reach their Nearest Walkabout Points with Enough RSSI to achieve the Given PHY Data Rate. Asterisks denote that the AP did not have enough transmit power to provide a high enough RSSI at the walkabout point to achieve the given PHY data rate.

We see that the path loss to some walkabout points is too high for the AP-walkabout link to achieve the highest PHY data rates. In these cases, the AP makes its best effort, e.g., sets its transmit power to maximum).

TABLE 1

| Potential candidate power plans | | |
| --- | --- | --- |
| PHY Data Rate (Mbps) | AP0 (dBm) | AP1 (dBm) |
| 1 | 10 | 20 |
| 2 | 20 | 20 |
| 5.5 | 20 | 20 |
| 11 | 20* | 20* |

After removing duplicates, we see that there are two unique power plans for AP0 and AP1

| Candidate power plans | |
| --- | --- |
| AP0 | AP1 |
| 10 | 20 |
| 20 | 20 |

Detailed Description of Block 205 of FIG. 2 of Determining a Candidate Frequency Plan for Each Candidate Power Plan Different alternate embodiments of the invention can use different transmit frequency planning methods to determine a frequency plan for each candidate power plan, and many such transmit frequency planning methods are known. Different embodiments of the present invention use different frequency allocation/frequency planning methods that only take AP-to-AP interactions into account. See for example I. Katzela, N. Naghshineh; "Channel assignment schemes for cellular mobile telecommunication systems: a comprehensive survey;" IEEE Personal Communications (June '96), for methods that were originally designed for 2G cellular systems. See also, U.S. Pat. No. 6,023,459 to Clark et al., and U.S. Pat. No. 6,178,328 to Tang, et al. Note that "Graph coloring" methods are known, and these methods may be used, in one of its many variations.

The inventors have found that while a graph coloring method may be used, such a family of methods is more suited to 2G cellular frequency planning. In WLANs, the inventors have found that the number of interfering APs is a more appropriate parameter, and so a frequency allocation method that attempts to minimize the measure of the number of AP-AP contentions, e.g., the Fast Evaluation Metric (FEM) is preferred. The FEM is also used by methods described in co-owned above-mentioned U.S. patent application Ser. No. 10/933,102.

Figure 4:
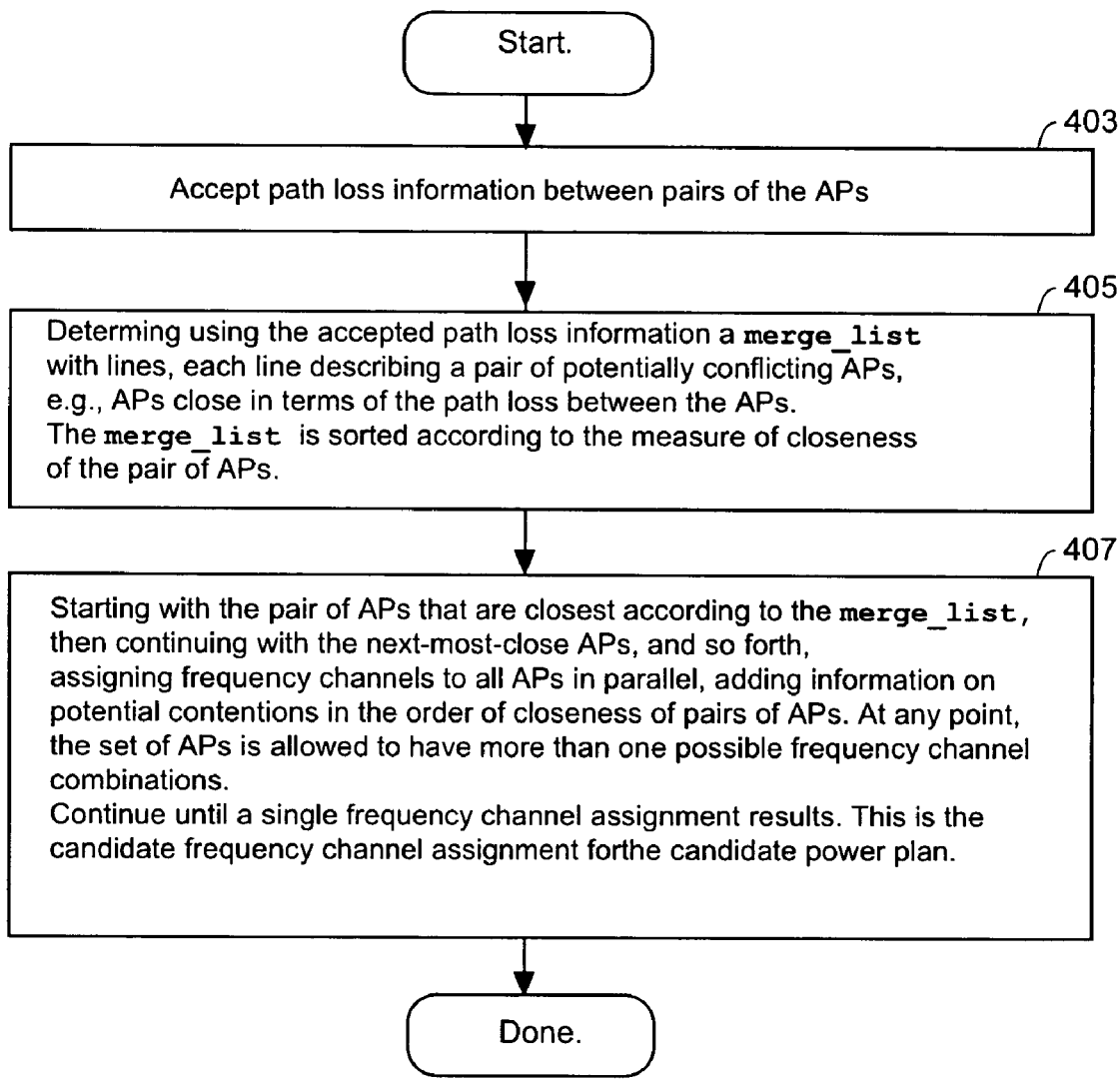
FIG. 4 shows one embodiment of the frequency plan determining method that includes assigning frequency channels for more than one AP in parallel.

FIG. 4 shows one embodiment of the frequency plan determining method that includes assigning frequency channels for a plurality of APs in parallel.

The method includes setting the candidate power plan as the power assignment for the managed APs, and accepting in 403 path loss information about the closeness of pairs of APs, in terms of path loss between pairs of APs. The "closeness information" is described by what is called the "merge_list", where each row of the merge_list describes a pair of potentially conflicting, e.g., close in the path loss sense, APs. The merge_list is ordered, in that first row contains the closest pair of APs, in the path loss sense, and the minimum path loss, the second row contains the next closest pair of APs, and the path loss between them, and so on. One embodiment includes in 405 so determining the merge_list from path loss information, while in another embodiment, the merge_list is directly provided in the sorted form, one line for each pair of APs.

The method further includes in 407 determining a frequency plan for the candidate power plan, the frequency plan determining taking AP-to-AP interactions into account using the merge_list, and not taking into account AP-to-client location-at-different-locations interactions, the frequency plan using a measure of number of AP-AP contentions determined from the merge_list.

The determining of a frequency plan for the candidate power plan in 407 includes assigning frequency channels for a plurality of APs in parallel. The determining of the frequency plan starts with considering contention between the most critically-close pair of APs, in terms of path loss, then considers the next-most close pair of APs, and continues considering potential contentions in order of closeness of pairs of APs. Each such consideration leading to a further refinement of a set of possible frequency allocations, until a single frequency plan is determined. At any point, each AP or group of APs is allowed to simultaneously have more than one possible frequency channel combination.

In one embodiment, the closeness information is used to determine a measure of potential contention between the pair of APs.

In more detail, one embodiment of the method includes accepting path loss information for the managed APs, and determining for pairs of APs, closeness information. For this, the method selects a number, denoted P of neighbors to consider for closeness information. For each managed AP, say APj indexed by j as j=0, 1, . . . , the method finds the nearest (in the path loss sense) P managed APs of the total number of APs, denoted num_managed_ap. In one embodiment a value of 6 for P is selected.

For each AP, say the AP of index j, P rows of three entries are stored as closeness/potential contention information, one per neighbor, in the closeness information list called "merge_list." For any AP, in order to avoid duplicates, only APs of an index less than the index of the considered AP are considered.

That is, for APj, only AP's of index less than j are considered. Each row of merge_list includes the path loss in dB to APj, the AP index j, and the neighbor AP index (less than j). This information is determined for all num_managed_ap managed APs. There are therefore at most num_managed_ap*P rows. One embodiment of the method includes sorting the merge_list according to path loss. That is, the first row of merge_list contains the closest pair of APs, in the path loss sense, as well as the minimum path loss, the second row of merge_list contains the next closest pair of APs, and the path loss between them, and so on.

As an example, suppose there are three managed APs: AP0, AP1, and AP2, and there are additional (unmanaged) APs. Suppose the path loss matrix is given by:

|     | AP0 | AP1 | AP2 | APx | APy | APz |
|-----|-----|-----|-----|-----|-----|-----|
| AP0 | 200 | 80  | 100 | 200 | 200 | 200 |
| AP1 | 90  | 200 | 200 | 60  | 50  | 40  |
| AP2 | 40  | 200 | 200 | 200 | 200 | 200 | where each row represents RSSIs detected by one of the (managed) APs, and all RSSIs are in dBm. Note that the last three columns of RSSIs for unmanaged AP transmissions are not used herein. Let P=2. For AP0 there are no neighbors with a lower index. For AP1, AP0 is the only neighbor with a lower index, while for AP2, AP0 and AP1 are neighbors. Then the unsorted merge_list is:

| RSSI | APj | otherAP |
|------|-----|---------|
| 90   | 1   | 0       |
| 40   | 2   | 0       |
| 200  | 2   | 1       |

The sorted merge_list is:

| RSSI | APj | otherAP |
|------|-----|---------|
| 40   | 2   | 0       |
| 90   | 1   | 0       |
| 200  | 2   | 1       |

Note that merge_list can be described as a set of rules, based on how close APs can be and still transmit on the same channel: first row states: place AP0 and AP2 on different channels from first row. The second row states: place AP0 and AP1 on different channels from second row, and so forth. That is, the rules avoid placing two APs on the same channel if they are less than a path loss threshold apart.

To continue, the method includes defining a data structure called "combo" for each managed AP or combination of APs, with a row in combo identifying the AP list, and the next rows identifying possible frequency channel plans, one plan per row.

Starting with one AP, combo for a single AP (of AP0, AP1, and AP2) is represented as:

| Combo No. |       |
|-----------|-------|
| 1         | AP01  |
|           | 1     |
|           | 6     |
|           | 11    |
| 2         | AP1   |
|           | 1     |
|           | 6     |
|           | 11    |
| 3         | AP2   |
|           | 1     |
|           | 6     |
|           | 11    |

Consider now combo with two APs. For each row in the merge list, if the two APs appear in the row, then they form the cross product of frequency plans. For example, the [40 20] row in merge_list leads to the following:

| Combo No. |     |     |
|-----------|-----|-----|
| 4         | AP2 | AP0 |
|           | 1   | 1   |
|           | 1   | 6   |
|           | 1   | 11  |
|           | 6   | 1   |
|           | 6   | 6   |
|           | 6   | 11  |
|           | 11  | 1   |
|           | 11  | 6   |
|           | 11  | 11  |
| 2         | AP1 |     |
|           | 1   |     |
|           | 6   |     |
|           | 11  |     |

Note that one embodiment maintains an up-to-date mapping from AP number (obtained from the merge_list) to combo number, even as the combos merge.

First Method of Paring Combos

One method of paring the allowed combos considers pairs of APs and possible contentions therewith. For such an embodiment, one interpretation of each line of the merge_list is as a rule applicable to assigning channels. Therefore, for three APs, denoted AP0, AP1, and AP2, suppose the first row of the merge_list includes AP0 and AP1. This can be interpreted as "keep AP0 and AP1 on different channels" (rule 1). Suppose the next row includes AP0 and AP2. That this is high up (one of the first entries) of the merge_list can be interpreted as "keep AP0 and AP2 on different channels." (rule 2). Note that the rules are applied according to a measure of potential contention, such as the path loss between the APs being below a predetermined threshold.

Each AP or group of APs is allowed to simultaneously have many possible frequency channel combinations. In the above rules, for example, after rule 1 we get the channel assignments for [AP0 AP2] as [1 6], [1 11], [6 1], [6 11], [11 1], [11 6]. Now additionally applying rule 2 includes assigning all three APs their frequency channel, and the allowed combinations are:

[AP0 AP1 AP2]=[1 6 6], [1 11 6], [1 6 11], [1 11 11], [6 1 1], [6 11 1], [6 1 11]... etc.

This is continued until the set of possible frequency allocation combinations is pruned by one or more rules in subsequent lines of the merge_list. That is, until the set of possible frequency allocation combinations is pruned by constraints imposed by less critically nearby APs.

In a particular version, if at any intermediate point in the considering of potential contentions, the number of possible frequency channel combinations is larger than a pre-selected threshold, the method includes considering potential contentions (lines of the merge_list) out of order to reduce the number of combinations in the set of possible Continuing with the above example, suppose in some future, but still high up (early on) line of the merge_list there is an entry that includes AP1 and AP2, and thus can be interpreted as the rule "keep AP1 and AP2 on different channels". Suppose further that the set of possible frequency channel combinations after rule 1 and rule 2 is too long. The method may jump ahead to a future line of the merge_list on the merge_list. Applying the rule therein leads to the set of possible frequency channel combinations:

[AP0 AP1 AP2]=[1 11 6], [1 6 11], [6 11 1], [6 1 11] [11 6 1] [11 1 6]

If this number of possible combinations is still too large, the method continues to jump ahead until the number of combinations is small enough.

Second Method of Paring Combos using the FEM

Another embodiment uses the Fast Evaluation Metric (FEM) described in co-owned above-mentioned U.S. patent application Ser. No. 10/933,102 as a measure of potential contention for paring the combos.

Once combos are determined, the method continues with calculating the FEM for each frequency plan, considering only the APs within the combo. The method includes calculating FEMs for all frequency plans and deleting plans with higher FEMs than the minimum FEM.

The fast evaluation metric operates by counting pairs of contending access points. For each pair of access points determining whether they contend involves consideration of the transmit power, path loss, and receiver sensitivity. For example, for a receiver sensitivity of −92 dBm, when the access points are transmitting at 20 dBm, if the path loss is less than 112 dB between any pair of access points, they will contend for the frequency channel. For the same receiver sensitivity, when the access points are transmitting at 0 dBm, if the path loss is less than 92 dB between any pair of access points, they will contend for the frequency channel. The determination of whether two access points contend includes a comparison of the path loss to a path loss threshold equivalent to the transmit power minus (in logarithmic terms) the receiver sensitivity. Furthermore, APs on different channels may still count towards the FEM if the pathloss and adjacent channel rejection is not high enough. Thus, the determining of whether two channels content includes ascertaining whether the transmit power of the transmitting channel less the receiver sensitivity exceeds or is equal to the sum of the path loss and the adjacent channel rejection between the transmitting and receiving stations. The adjacent channel rejection equals 0 for the same channel.

Much of the calculating of the FEM can be carried out by a pre-computation process. One embodiment of the invention uses a pre-defined lookup table of computations to provide for rapidly determining the FEM. Define chan_max as the maximum channel number, e.g. for channels 1, 6 and 11, chan_max=11. Define num_chan to be the number of channels. Define num_managed_ap as the number of managed APs. Define a 2D array, fem_lut, of size num_chan*num_managed_ap by num_managed_ap*num_chan.

If a first managed AP denoted APi on a channel denoted chan_i can receive another managed AP, denoted APj on chan_j, (i≠j), taking into account the transmit power of APj, the channel separation (as a number) between chan_i and chan_j, typical adjacent-channel interference performance, and the receiver sensitivity of APi, then the entry in fem_lut for APi on channel chan_i and APj on channel chan_j is set to unity.

Unmanaged APs contribute to the diagonal of fem_lut. If managed APi on channel chan_i can receive unmanaged APj on its channel chan_i, taking into account the transmit power of APj, the channel separation between APj's channel and chan_j, typical adjacent channel interference performance, and the receiver sensitivity of APi, then the diagonal entry in fem_lut for APi on channel chan_i and receiving APi on channel chan_i is incremented.

After the pre-calculation of fem_lut, the FEM of a subset of managed APs can be calculated as follows: The subset is described by the APs' indices, ap_list, and the channels they are on, chan_list. By calculating the vector sum chan_max * ap_list+ch_list, a new set of indices is formed, fem_lut_idx. The sum of all entries in fem_lut that have one entry of fem_lut_idx as a row index, and another entry of fem_lut_idx as a column index is the FEM of that subset. For example, in the Matlab code language (Matlab®, The MathWorks, Inc., Natick, Mass.), this is sum(sum(fem_lut(fem_lut_idx, fem_lut_idx))). For instance, suppose that fem_1 t equals:

| 1 | 2 | 3 | 4 |
| 5 | 6 | 7 | 8 |
| 9 | 0 | 1 | 2 |
| 3 | 4 | 5 | 6 | and fem_lut_idx=[0 3] then the FEM=1+4+3+6=14.

Note that in practice, the full array fem_lut is sparse, with zero entries for large num_managed_ap, and also many unused entries. For example, if the channel set is [1 6 11] and the managed APs are found only on channels 1, 6 or 11, then entries for channels 2, 3, 4, 5, 7, 8, 9, and 10 need not be calculated or stored. Instead, the location of "useful" non-zero entries and their values should be stored, in such a way that the summation over the fem_lut_idx row and column indices can execute efficiently.

Now continuing further with the determining of the FEM for channel assignment example, suppose there are three managed APs, and the path loss matrix is (as provided above, re-written here for convenience):

|     | AP0 | AP1 | AP2 | APx | APy | APy |
| --- | --- | --- | --- | --- | --- | --- |
| AP0 | 200 | 80  | 100 | 200 | 200 | 200 |
| AP1 | 90  | 200 | 200 | 60  | 50  | 40  |
| AP2 | 40  | 200 | 200 | 200 | 200 | 200 |

Suppose further that the APs' sensitivity is −92 dBm, and suppose the unmanaged APs APx, APy, and APz are on channels 1, 6 and 11 respectively. Suppose further that the adjacent channel rejection is [0 2 8 18 42 52 52 52 52 52 52] dB for 0, 1, 2, . . . 10 channels of separation respectively. Then the "useful" part of the pre-computer fem_lut that includes only those channel numbers on which transmission can occur—channels [1 6 11], for three managed APs AP0, AP1 and AP2 is:

FEM lookup table fem_lut

|  | AP0 | | | AP1 | | | AP2 | | |
| --- | --- | --- | --- | --- | --- | --- | --- | --- | --- |
|  | 1 | 6 | 11 | 1 | 6 | 11 | 1 | 6 | 11 |
| AP0 on ch. 1: | 0 | 0 | 0 | 1 | 0 | 0 | 1 | 0 | 0 |
| AP0 on ch. 6: | 0 | 0 | 0 | 0 | 1 | 0 | 0 | 1 | 0 |
| AP0 on ch. 11: | 0 | 0 | 0 | 0 | 0 | 1 | 0 | 0 | 1 |
| AP1 on ch. 1: | 1 | 0 | 0 | 3 | 0 | 0 | 0 | 0 | 0 |
| AP1 on ch. 6: | 0 | 1 | 0 | 0 | 3 | 0 | 0 | 0 | 0 |
| AP1 on ch. 11: | 0 | 0 | 1 | 0 | 0 | 2 | 0 | 0 | 0 |
| AP2 on ch. 1: | 1 | 1 | 1 | 0 | 0 | 0 | 0 | 0 | 0 |
| AP2 on ch. 6: | 1 | 1 | 1 | 0 | 0 | 0 | 0 | 0 | 0 |
| AP2 on ch. 11: | 1 | 1 | 1 | 0 | 0 | 0 | 0 | 0 | 0 |

From this part of fem_lut, the FEMs of APs AP0 and AP1 are as shown in the following Table:

| AP2 | AP0 | FEM |
| --- | --- | --- |
| 1 | 1 | 2 |
| 1 | 6 | 1 |
| 1 | 11 | 1 |
| 6 | 1 | 1 |
| 6 | 6 | 2 |
| 6 | 11 | 1 |
| 11 | 1 | 1 |
| 11 | 6 | 1 |
| 11 | 11 | 2 |

Three rows have suboptimal FEMs of 2, so they are deleted, leaving the following frequency plans for AP0 and AP2:

| AP2 | AP0 |
| --- | --- |
| 1 | 6 |
| 1 | 11 |
| 6 | 1 |
| 6 | 11 |
| 11 | 1 |
| 11 | 6 |

After the deletion of suboptimal FEMs, the method includes, if the number of surviving frequency plans, denoted M, is still more than a predetermined number M_thresh, calculating a channel histogram for each frequency plan and deleting plans with more uneven channel distributions than the minimum, e.g., as indicated by the difference between the maximum and the minimum in the histogram.

As a new example, suppose that there are M=4 surviving frequency plans, and suppose M_thresh=3: The histograms are:

| Plan (chann.) AP2 AP0 AP1 | Channel histogram 1 6 11 | max(hist) − min(hist) |
| --- | --- | --- |
| 1 1 1 | 3 0 0 | 3 − 0 = 3 |
| 6 6 6 | 0 3 0 | 3 − 0 = 3 |
| 6 11 6 | 0 2 1 | 2 − 0 = 2 |
| 1 6 1 | 2 1 0 | 2 − 0 = 2 |

In the above, the first two frequency plans concentrate APs on one channel, whereas the last two plans distribute the APs on channels more evenly. Therefore the first two plans are deleted, leaving:

| AP2 | AP0 | AP1 |
| --- | --- | --- |
| 6 | 11 | 6 |
| 1 | 6 | 1 |

So that there are now only two surviving plans. This satisfies the M_thresh condition (M≦M_thresh).

If, on the other hand, after the deletion of the unevenly distributed plans, there are still more than M>M_thresh surviving frequency plans, the method includes deleting all but plans numbered:

round(0*M/(M_thresh−1)), round(1*M/(M_thresh−1)), . . . , round((M_thresh−1)*M/(M_thresh−1)).

This "uniformly samples" the solution set, and ensures that there are only M_thresh frequency plans in the combo, or at most M_thresh*M_thresh frequency plans immediately after a cross-product is calculated. Choices for M_thresh are discussed below.

Once all combos are merged into one combo, the method stops with the frequency plan. The following assumes the FEM method was used.

Note that the inventors have found that with the construction of merge_list for P>0 as described above, there will be no more than one combo remaining after all rows of the merge_list have been processed.

The final combo contains between 1 and M_thresh possible frequency plans, with the same FEM, but channel histograms with different unevenness are possible.

Therefore according to one embodiment, the method includes deleting plans with more uneven channel distributions than the minimum as described above, then returning the first frequency plan of the remaining frequency plans. In a new example, assume that after all the combos are merged into one, four candidate frequency plans remain:

| AP2 AP0 AP1 | Histogram | max(hist) − min(hist) |
| --- | --- | --- |
| 1 1 1 | 3 0 0 | 3 − 0 = 3 |
| 6 6 6 | 0 3 0 | 3 − 0 = 3 |
| 6 11 6 | 0 2 1 | 2 − 0 = 2 |
| 1 6 1 | 2 1 0 | 2 − 0 = 2 |

The first two plans are deleted because their channel histograms are more uneven than the minimum. The algorithm returns to the first plan of the remainder, that is the plan:

| AP2 | AP0 | AP1 |
| --- | --- | --- |
| 6 | 11 | 6 | which should be reordered as:

|     | AP0 | AP1 | AP2 |
| --- | --- | --- | --- |
|     | 11  | 6   | 6   |

Choices for M_thresh

The inventors have found that for IEEE 802.11 networks in the 2.4 GHz band, a value of M_thresh=20 is satisfactory. For IEEE 802.11 networks in the 5 GHz band, a value of M_thresh=100 works well.

Calculation of the Combined Metric for Step 207 and Step 209

Step 207 (FIG. 2) includes determining the combined metric (CM). Furthermore, step 209 also includes determining the CM.

One embodiment of determining the CM uses a method as described in above-mentioned incorporated by reference U.S. application Ser. No. 10/933,102 using the CM metric described in above-mentioned incorporated by reference U.S. application Ser. No. 10/791,466.

Figure 5:
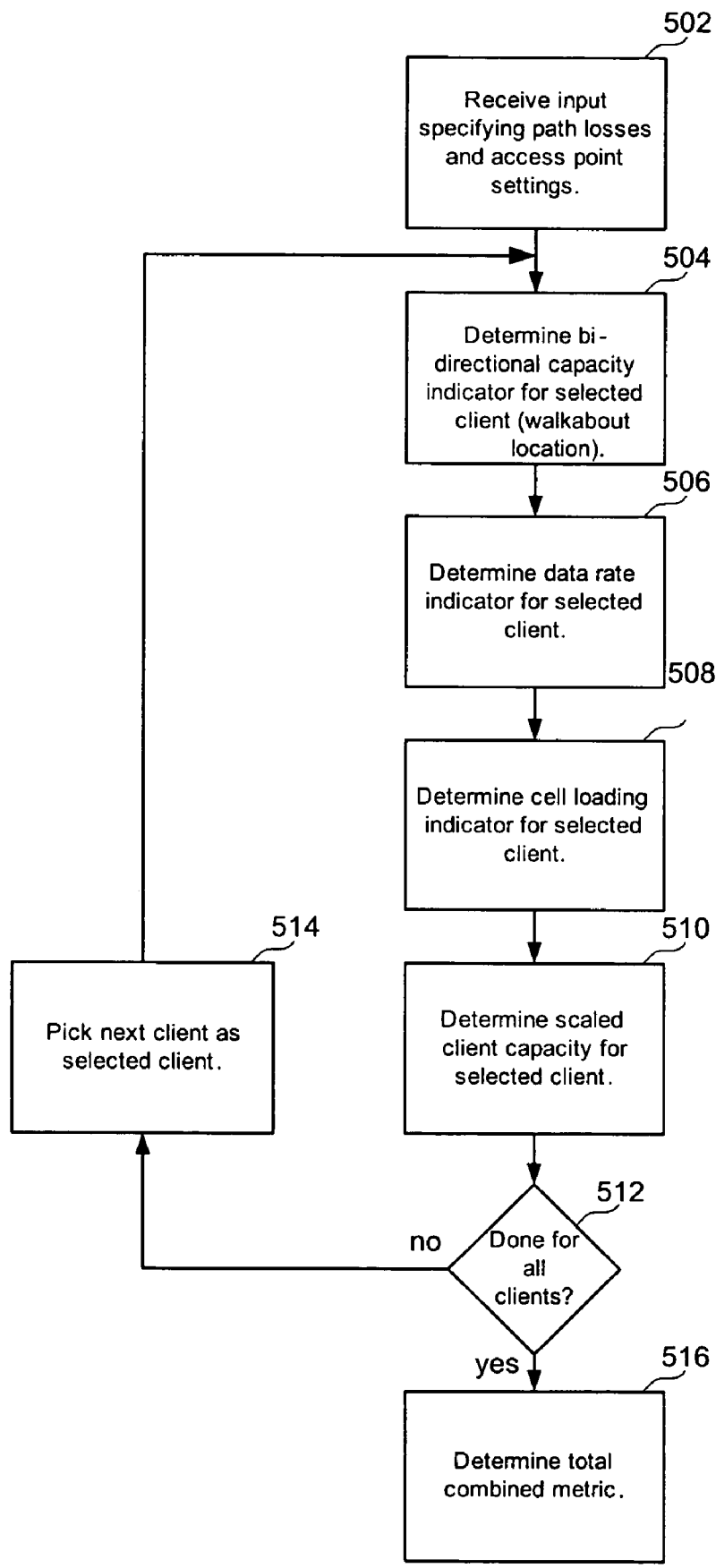
FIG. 5 is a flowchart describing steps of evaluating a combined network quality metric according to one embodiment of the present invention.

FIG. 5 is a flow chart describing steps of evaluating communication quality for the communication network according to one embodiment of the present invention. At step 502, the metric evaluation procedure receives input specifying path losses and access point settings. The path loss values indicate the path attenuation from a series of walkabout points to each access point as well as the attenuations between access points. Some of the walkabout points will correspond to actual client locations or be used as proxies for client locations in the calculations that follow. The path loss values are preferably based on actual measurements rather than on propagation modeling. The access point settings include the frequency channels of operation. For example, in one implementation, the frequency channel set (1, 6, 11) is specified for each access point. It is also possible for the input to specify a particular frequency channel set among several selections including, e.g. (1, 6, 11), (1, 4, 8, 11), or (1, 4, 6, 8, 11). The access point settings may also include a list of allowed data rates since access points may be configured to operate in only a subset of possible data rate modes.

A series of steps following step 502 are performed iteratively for each client location. The term "client location" as used herein is taken to also include walkabout locations taken as proxies for client locations. Step 504 determines a bi-directional capacity indicator for a selected client location. Capacity as defined in this context as how readily an access point can transmit data downstream to client locations, or conversely how readily a client location can transmit information upstream to the access point. Effectively, the bi-directional capacity indicator measures impairment due to likely contention or collision situations. Details of computing the bi-directional capacity for a selected client location are described in detail below. The computation of the bi-directional capacity indicator incorporates an upstream capacity computation for the client location and a downstream capacity computation for the access point the client location is associated with.

A step 506 determines a data rate indicator for the selected client location. The received signal strength is mapped into a rate of data transfer between the client location and the access point. Each possible data rate having a signal level above which data can be transferred reliably. The received signal strength is mapped to a physical layer data rate using a lookup table. That physical layer data rate is then converted into a MAC layer data rate using a lookup table such as the one that has the data of the following table:

| Modulation Mode | Data Rate | Typical Rx Sensitivity (typical) | MAC Throughput |
| --- | --- | --- | --- |
| 802.11b | 1 Mb/s | −92 dBm | .75 Mb/s |
|  | 2 Mb/s | −86 dBm | 1.2 Mb/s |
|  | 5.5 Mb/s | −84 dBm | 2.3 Mb/s |
|  | 11 Mb/s | −77 dBm | 3.2 Mb/s |
| 802.11a | 6 Mb/s | −88 dBm | 3.4 Mb/s |
|  | 9 Mb/s | −79 dBm | 4.6 Mb/s |
|  | 12 Mb/s | −81 dBm | 5.4 Mb/s |
|  | 18 Mb/s | −78 dBm | 6.7 Mb/s |
|  | 24 Mb/s | −76 dBm | 7.8 Mb/s |
|  | 36 Mb/s | −69 dBm | 9 Mb/s |
|  | 48 Mb/s | −64 dBm | 9.7 Mb/s |
|  | 54 Mb/s | −60 dBm | 10.1 Mb/s |

Figure 11A:
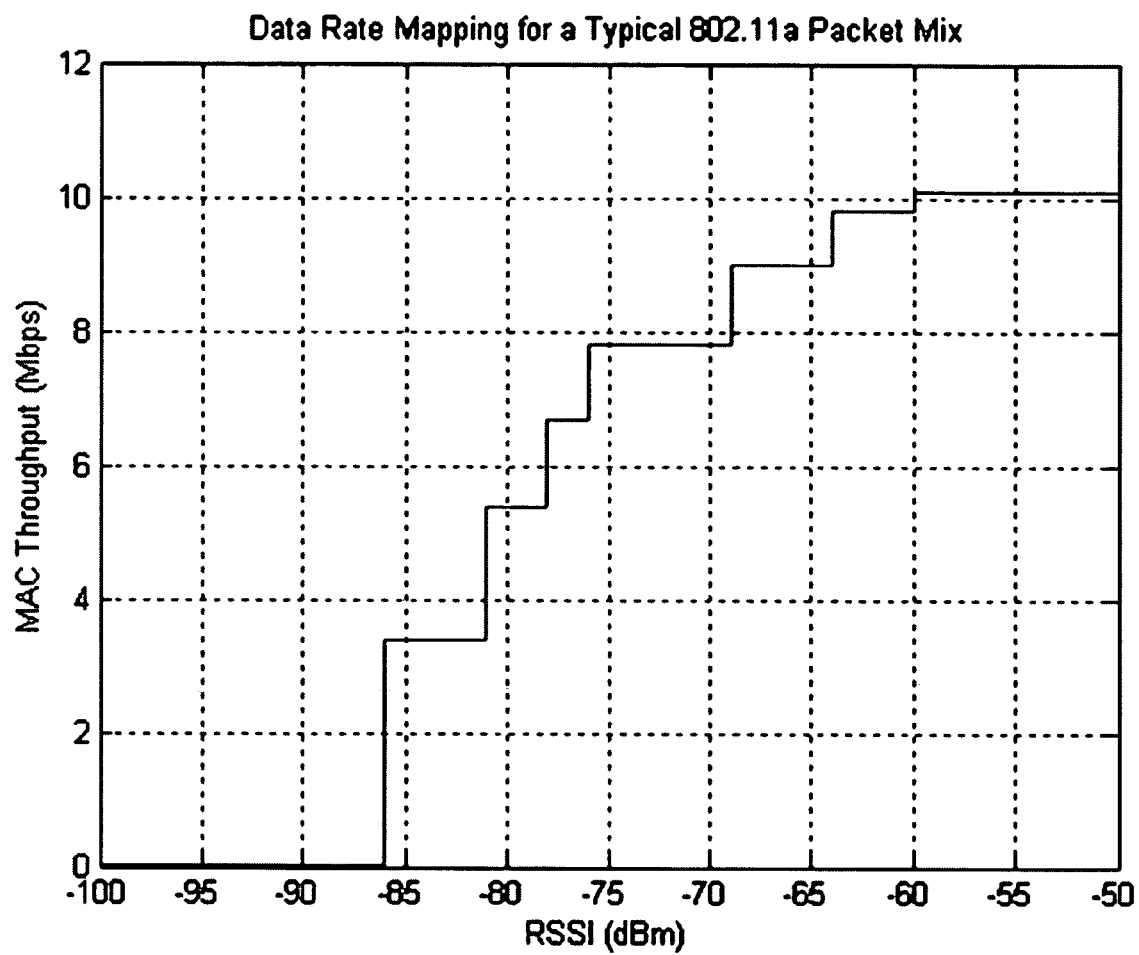
FIGS. 11A-11C depict MAC data rate metrics for different variants of the IEEE 802.11 standard according to one embodiment of the present invention.
Figure 11B:
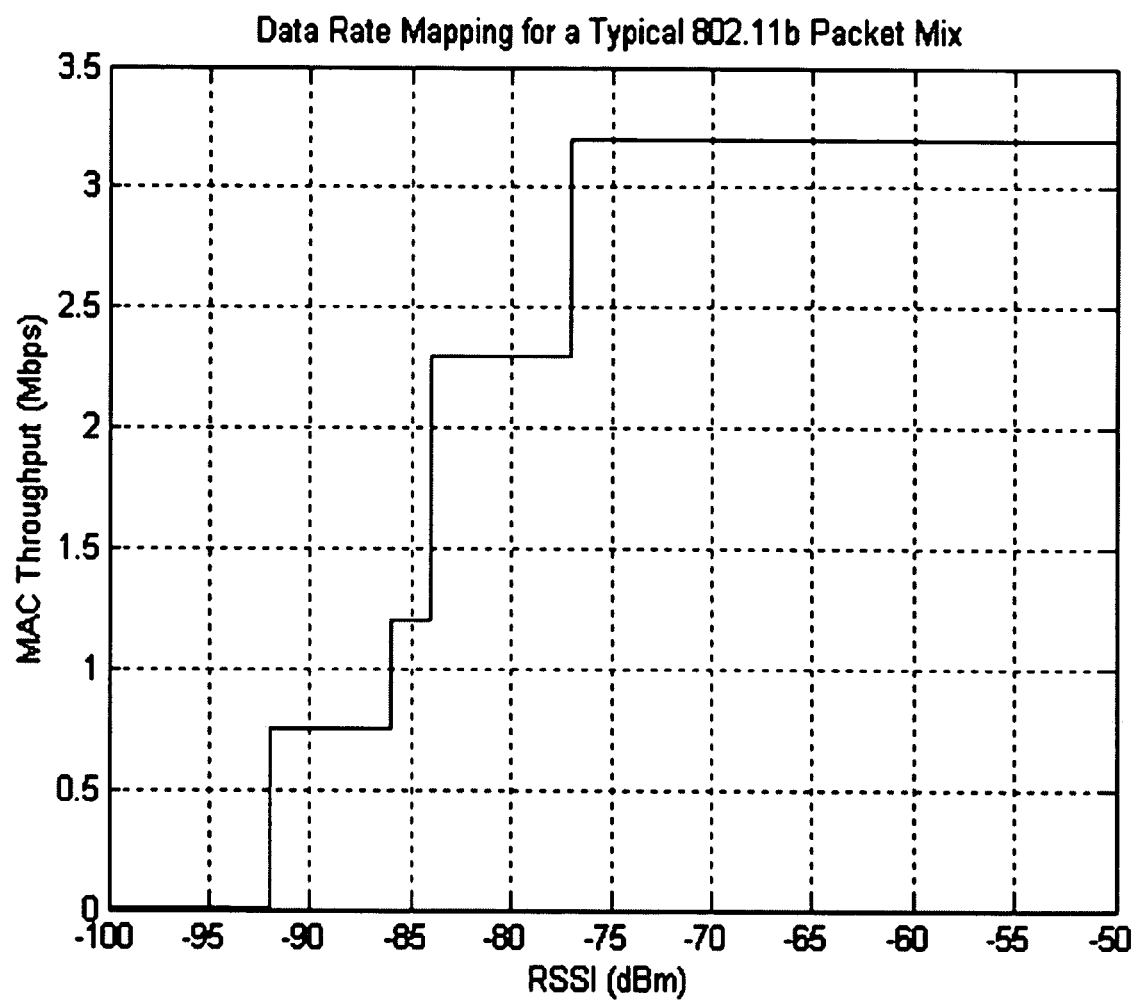
Figure 11C:
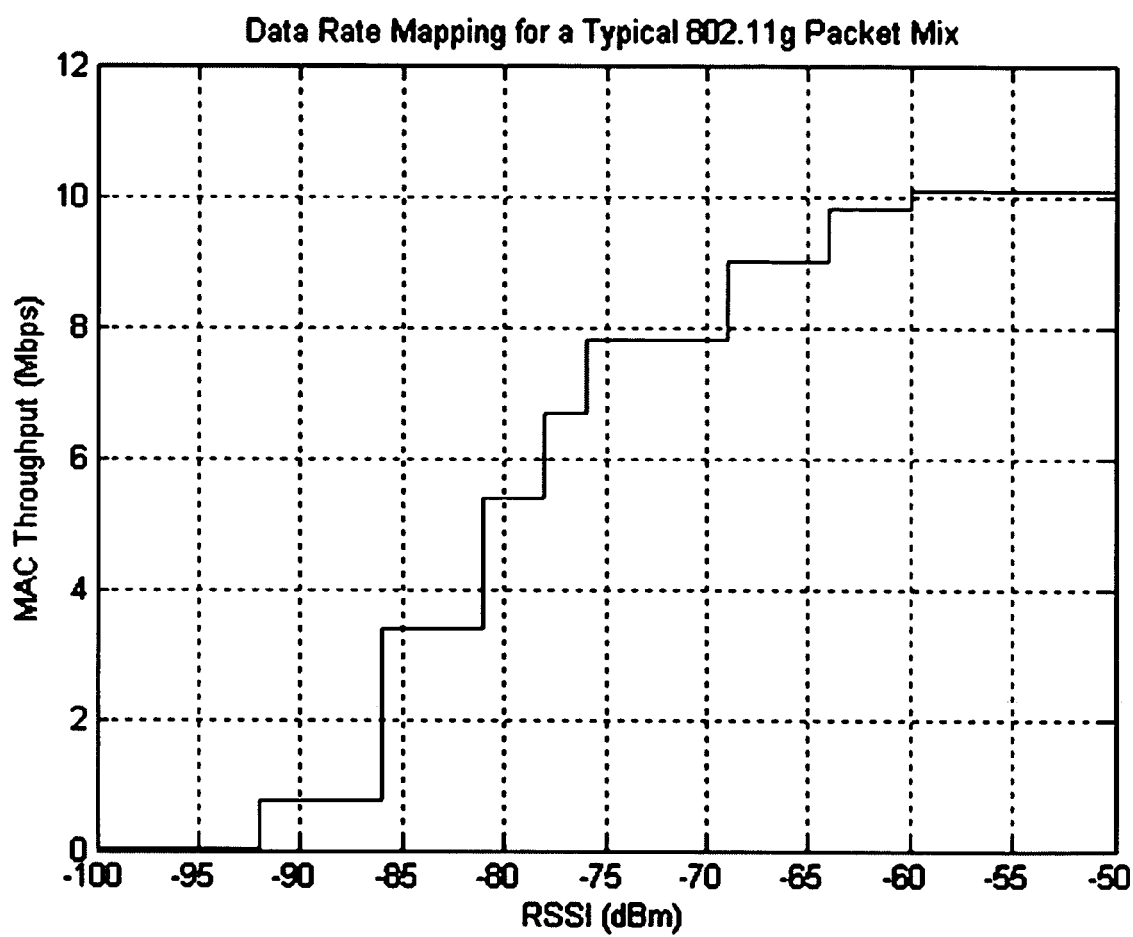

FIGS. 11A-11C graphically illustrate the relationships between receiver sensitivities and data rates for 802.11a, 802.11b, and 802.11g, respectively. The mapping of the physical layer data rate into the MAC layer data rate depends on the average packet size and the MAC protocol being used. Therefore the network performance can be optimized for voice (short 100 to 200 byte packets) or for large TCP-IP transfers (1536 byte packets). The above table is for a typical packet mix with a mean packet size of 364 bytes.

A step 508 determines a cell loading indicator for the selected client location. Cell loading actually needs to be determined only once for each access point so it will be understood that the cell loading indicator for a client location is in fact a cell loading indicator of the access point to which it is associated. The cell loading indicator accounts for a throughput drop that results when too many client locations are associated to a single access point. The user of the evaluation procedure defines the maximum number of client locations that can be associated to a single access point without performance degradation. Up to that maximum number, no degradation is experienced while beyond that number, the cell loading metric falls off proportionally to 1/(number of associated client locations). Further details of cell loading are explained below.

The capacity, data rate, and cell loading indicators are used to provide a measure of the data throughput of each client location. At step 510 determines a scaled client location capacity for a selected client location. The metrics are combined to produce of a measure of client location throughput (denoted client location_throughput) as follows:

client location_throughput=Client location Bidirectional Capacity Indicator* Client location Data Rate*

Cell Loading Indicator.

where, as throughout this description, "*" denotes multiplication.

Client location_throughput provides an estimate of the mean rate of data transfer between the client location and its access point. The reciprocal provides a measure of the amount of time it will take to transfer large data records to and from a particular client location.

A step 512 tests whether the calculations of steps 504-510 have been done for all client locations in the network. If there are further client locations for which to compute the appropriate indicators, step 514 picks the next client location as the selected client location and then execution returns to step 504. If scaled client location capacity has been determined for all of the client locations, then the metric computation reaches step 516 where a total combined metric for the network is determined. In one embodiment, the combined metric CM is defined as:

$$CM = \frac{1}{\sum_{\text{allclients}} 1/(\text{client\_throughput})}$$

The above combined metric is not exactly the same as the total network capacity. The combined metric gives more weight to client locations with poor performance than those with good performance. A network where 90% of the client locations can receive 11 Mbps and 10% of the client locations can receive nothing is penalized as compared to a network where 80% of the client locations receive 11 Mbps, 10% receive 5.5 Mbps, and 10% receive 1 Mbps. Alternatively, a total network capacity may be determined as a mean of all of the scaled client location throughputs times the total number of access points in the network:

Capacity Details

Capacity is defined for each access point, for each client location, and for the entire network. The evaluation procedure relies on assumptions as to the fraction of time that the fully loaded wireless medium transmits successfully in the uplink and downlink. Representative values are PU=0.2 (probability that a transmission on that link will be upstream) and PD=0.8 (probability that a transmission on that link will be downstream). From the viewpoint of capacity, the ideal is a single access point and a few client locations operating with no potential co-frequency channel or adjacent-frequency channel interference. Such a situation will yield a capacity measure of 1. Interference from other cells will lower the expected capacity for that cell to some value less than 1. The metric penalizes capacity when stations experience contention or collision. Capacity computations depend on received signal strengths. The received signal strengths are determined based on the transmit power and path losses that were input into the algorithm.

There are theoretically 9 different types of contention and collision that could occur within a cell. They are:

1. External access points contending with the access point attempting to transmit downstream.
2. External access point colliding with the access point attempting to transmit downstream.
3. External access point contending with a client location attempting to transmit upstream.
4. External access point colliding with a client location attempting to transmit upstream.
5. External client location contending with an access point attempting to transmit downstream.
6. External client location colliding with an access point attempting to transmit downstream.
7. External client location contending with a client location attempting to transmit upstream.
8. External client location colliding with a client location attempting to transmit upstream.
9. Client location collides with another client location in the same cell.

To alleviate the need for cumbersome client location-to-client location path loss measurements, the presently described evaluation procedure only takes into account the first 5 types of contention and collision. The use of the scaling factors PU and PD within the capacity calculations allows results based on only the first 5 types of contention and collision to serve as a realistic estimate of the desired capacity indicator.

First let us consider the downstream capacity of an access point. The downstream capacity of an access point is calculated as its ability to transmit downstream data in the presence of interference from other access points and client locations from other cells. The access point capacity is expressed as a quotient where the numerator is always 1. In an ideal case, the denominator is also 1, but co-frequency channel interference from other cells will increase the value of the denominator. As will be shown, the denominator will be equal to 1 plus the sum of various degradation indicators.

Figure 6:
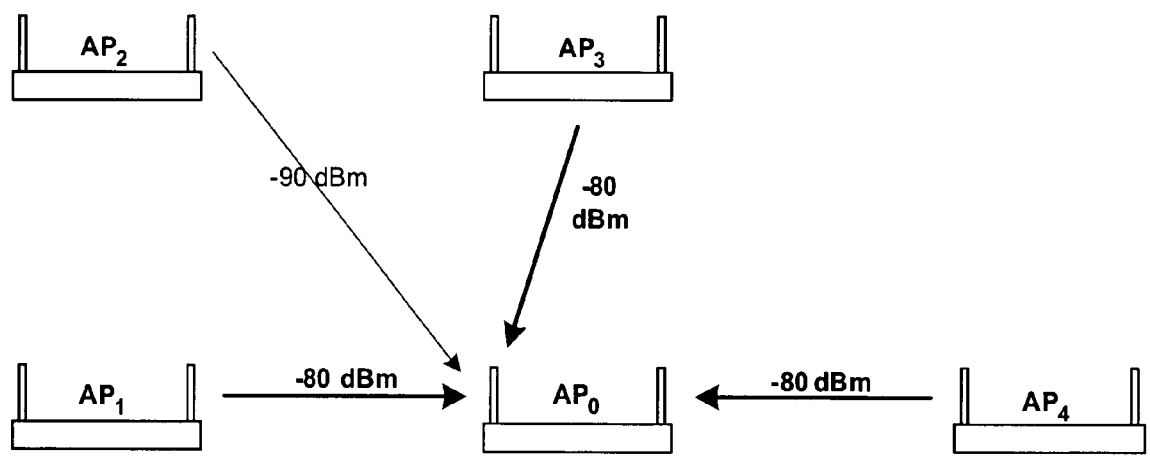
FIG. 6 depicts access point contention with other access points as evaluated by a combined metric according to one embodiment of the present invention.

The capacity calculation including the determination of various degradation indicators will be discussed with reference to a specific example. FIG. 6 shows access point contention with other access points. All 5 access points operate on the same frequency channel and the receiver sensitivity for the minimum data rate mode is −85 dBm. The arrows show the received signal strengths at AP0 for co-frequency channel transmission by the other access points. The received signal levels are derived from the path losses and transmit powers that were input to the evaluation procedure. Signals transmitted by AP1, AP3, and AP4 are all at −80 dBm, 5 dB above the receiver sensitivity of AP0. Since AP0 will hear these transmissions before it attempts to transmit, AP0 will not transmit when any of these three access points are transmitting. By contrast, signals transmitted from AP2 arrive at AP0 at −90 dBm, below the receiver sensitivity threshold. Therefore, contention with AP2 will not degrade the downstream throughput. The degradation indicator for this type of contention is computed to be:

Pd*No_AP_Contend where Pd is the probability of the contending access point wants to transmit, nominally set to 0.8; and No_AP_Contend=the number of transmitting access points that can be received by the access point of interest, 3 in our example.

In this example, the degradation caused by the other access points is 0.8*3=2.4.

Figure 7:
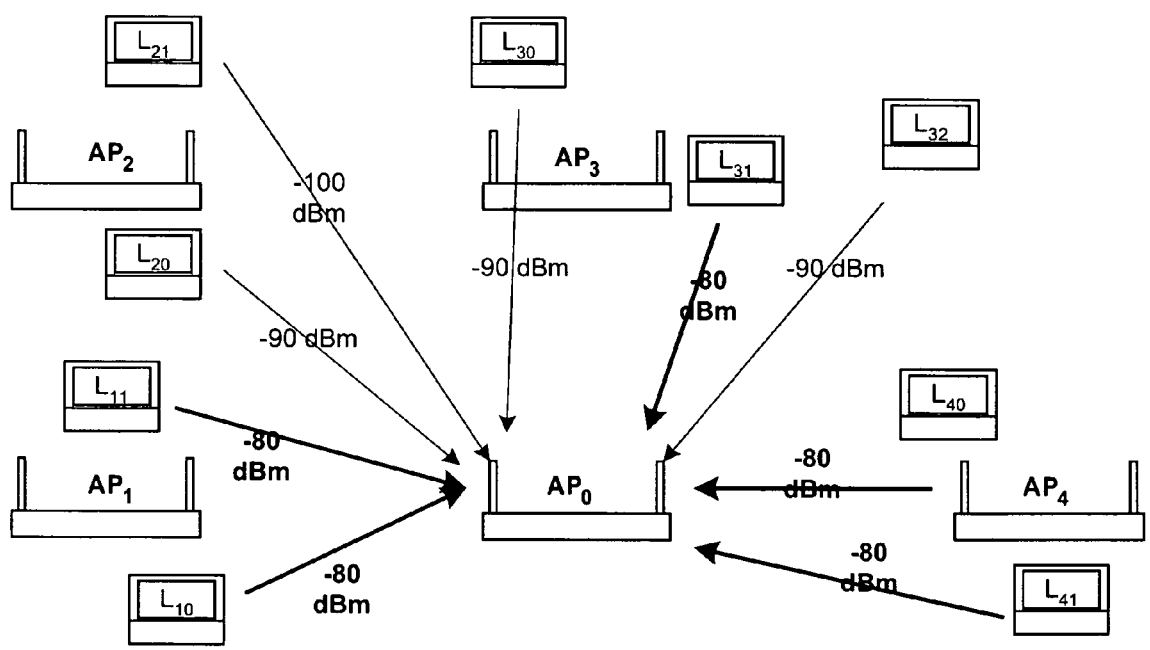
FIG. 7 depicts access point contention with client locations as evaluated by a combined metric according to one embodiment of the present invention.

FIG. 7 shows downstream traffic degradation due to contention with client locations associated with other access points. Client locations are annotated as Lab, where a and b are indices, with a indicating the index of the AP to which the client locations are associated. In this example, L10 and L11 are associated with AP1, L20 and L21 are associated with AP2, L30, L31, and L32 are associated with AP3, and L40 and L41 are associated with AP4. The sensitivity of AP0 is −85 dBm so transmissions from L10, L11, L31, L40, L41 will cause AP0 to wait to transmit its downstream data, thus degrading the quality of its downstream link. The quantitative measure of degradation caused by each potentially colliding client location is calculated as:

PU/Number of client locations in the same cell.

So for PU=0.2, the contending client locations contribute as follows:

L10=0.2/2=0.1
L11=0.2/2=0.1
L20=0, No Contention
L21=0, No Contention
L30=0, No Contention
L31=0.2/3=0.067
L32=0, No Contention
L40=0.2/2=0.1
L41=0.2/2=0.1

The sum of all the degradations caused by client locations contending with AP0 is 0.467.

Figure 8:
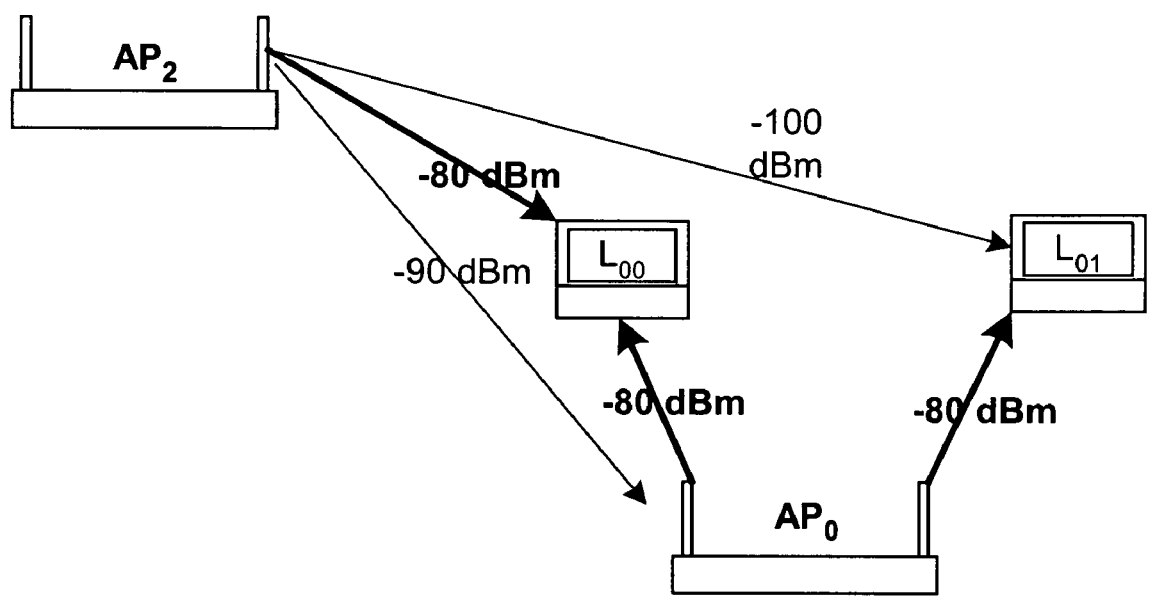
FIG. 8 depicts access point collision with other access points as evaluated by a combined metric according to one embodiment of the present invention.

FIG. 8 depicts access points colliding with other access points. In FIG. 6, it was shown that AP0 would contend with AP1, AP3, and AP4 for the frequency channel, but it would not contend with AP2 because the signal from AP2 was too weak to be detected by AP0. Therefore it is possible that AP2 could be transmitting simultaneously with AP0 since AP0 will not know to delay its transmission. If the signal from AP2 is strong enough to corrupt reception at the client locations associated with AP0, AP2's transmissions will potentially collide with downstream traffic from AP0. The potential for collision is based on the needed carrier to interference ratio. This is determined by first calculating the received signal strengths at the access point and the client location, then determining the physical layer data rate and required carrier to interference ratio by reference to a look-up table.

Continuing with FIG. 8, if the client locations L00 and L01 are operating in a data mode that requires 15 dB carrier to interference ratio, L00 will experience collisions from AP2 while L01 will not. The first client location, L00 receives a signal of −80 dBm from AP0 and it receives an interfering signal of −80 dBm from AP2. The carrier to interference ratio is therefore 0 dB, and L00 will therefore experience a collision. The client location L01 receives a signal of −80 dBm from AP0 and an interfering signal of −100 dBm from AP2, resulting in a carrier to interference ratio of 20 dB, sufficient to avoid a collision.

The degradation caused by these access point collisions from another access point is calculated as follows:

$$2 * \sum_{\text{other access points}} \frac{\text{number of clients experiencing collisions from other access points}}{\text{number of clients in cell}}$$

The summation is taken over all access points other than the access point whose capacity is being measured. In this example, there is only one access point causing a collision, so the total degradation is 2*(½)=1.

The total access point capacity is then computed as follows:
Numerator=1;
Denominator=(1+Degradation due to access point to access point contention+Degradation due to access point to client location contention+Degradation due to access point to access point collisions).
In this example, the capacity would be:
Numerator=1;
Denominator=1+2.4+0.467+1=4.867;
Access point capacity=1/4.867=0.205.

Contention and collision from other cells will also cause a reduction in the upstream capacity of each client location. Upstream client location capacity can be degraded by contention from other access points as well as collision from other access points. Client location contention from other access points occurs when signals transmitted from other cells arrive at the client location and lead the client location to believe its frequency channel is busy, causing the client location to delay transmission. Client location collision from other access points is caused when signals transmitted from access points in other cells arrive at sufficiently weak levels such that the client location transmits simultaneously, however, the carrier to interference ratio at the client location's associated access point is too low for successful data recovery there. Similar to the access point computation, the client location upstream capacity computation uses a ratio where the numerator is one and the denominator is one plus a sum of degradation indicators.

Figure 9:
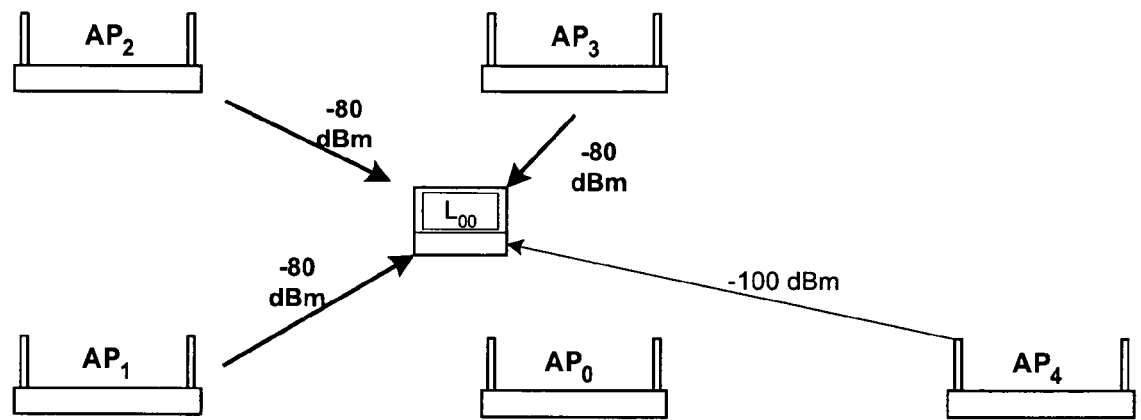
FIG. 9 depicts client location contention with access points other than an access point associated with the client location as evaluated by a combined metric according to one embodiment of the present invention.

FIG. 9 depicts client location contention with other access points. The client location at location L00 wants to transmit data to AP0 however, it can detect signals transmitted from AP1, AP2, and AP3. It cannot hear signals transmitted from AP4. Whenever AP1, AP2, and AP3 are transmitting, L00 delays transmission. The degradation caused by contention from other access points is evaluated to be equal to the number of access points from other cells that can be detected at the client location. In this example, for L00, the degradation is 3.

Figure 10:
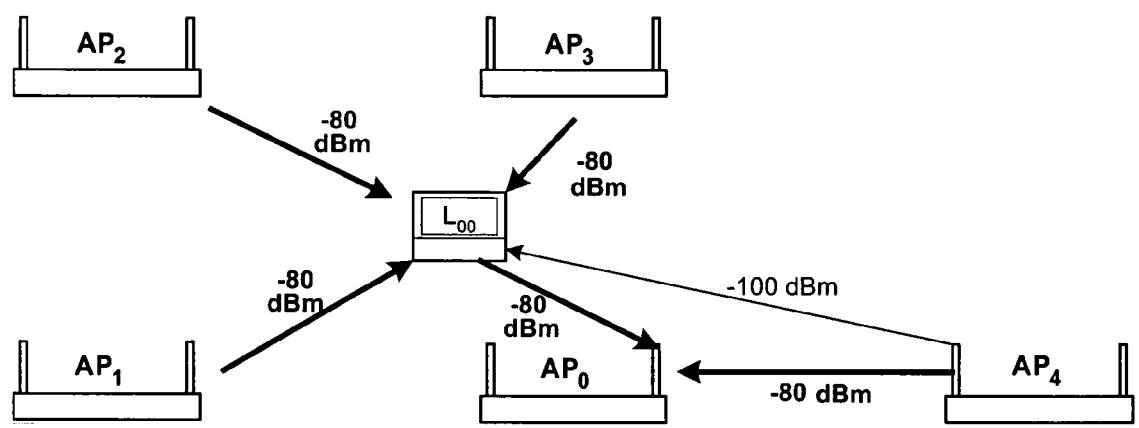
FIG. 10 depicts client location collisions with access points other than an access point associated with the client location as evaluated by a combined metric according to one embodiment of the present invention.

FIG. 10 depicts client location collisions with access points other than the one it is associated to. Client location L00 hears signals transmitted from AP1, AP2, and AP3 so it will delay transmission. However, L00 will not hear signals transmitted from AP4 so there is a potential for a collision. When client location L00 transmits to AP0, the signal arrives at −80 dBm. If AP4 transmit simultaneously, the carrier to interference ratio for the received client location signal is 0 dB, insufficient for successful data recovery. The indicator for this type of degradation is computed to be 2 multiplied by the number of access points capable of causing a collision. An access point is capable of causing a collision if the signal from that access point received at the client location's associated access point causes the received client location signal carrier to interference ratio to fall below the threshold necessary for accurate reception. In this example, this expression is equal to 2 since there is one such access point capable of causing a collision.

The total upstream capacity for a client location is calculated as follows:
Numerator=1;
Denominator=1+Degradation caused by contention with out-of-cell access points+Degradation caused by collisions with out-of-cell access points.
In this example:
Numerator=1;
Denominator=1+3+2=6;
Total upstream client location capacity=⅙ or 0.167.

The total bidirectional client location capacity is then:
Associated Access Point Capacity*Pd+Client location Upstream capacity*Pu,
where Pd is nominally 0.8 and Pu is nominally 0.2. In this example, the result is 0.1974. This is the value that is used in computing the scaled client location capacity at step 110.

Cell capacity=access point capacity*Pd+mean client location capacity*Pu.

The mean client location capacity is the average upstream client location capacity for the client locations associated with the access point of a cell.

Cell Loading

Cell loading is a measure of degradation caused by an excessive number of client locations in a cell potentially contending for the same frequency channel. The exact number of client locations that can successfully share a frequency channel in a cell depends on separately generated usage models. A parameter generated by such a usage model is max_client locations which is the maximum number of client locations in a cell before performance suffers as determined by the usage model. An additional parameter to be entered by the operator is mean_client locations which is equal to the average number of client locations in each cell.

First, the number of client locations in each cell is estimated by: EST_CLIENT LOCATIONS=(number of walkabout points in cell/total number of walkabout points)*mean_ client locations. The capacity scaling factor due to overcrowding on an access point is then calculated as:

Cell_Loading_factor=max_client locations/max(max_client locations, est_client locations)

Figure 12:
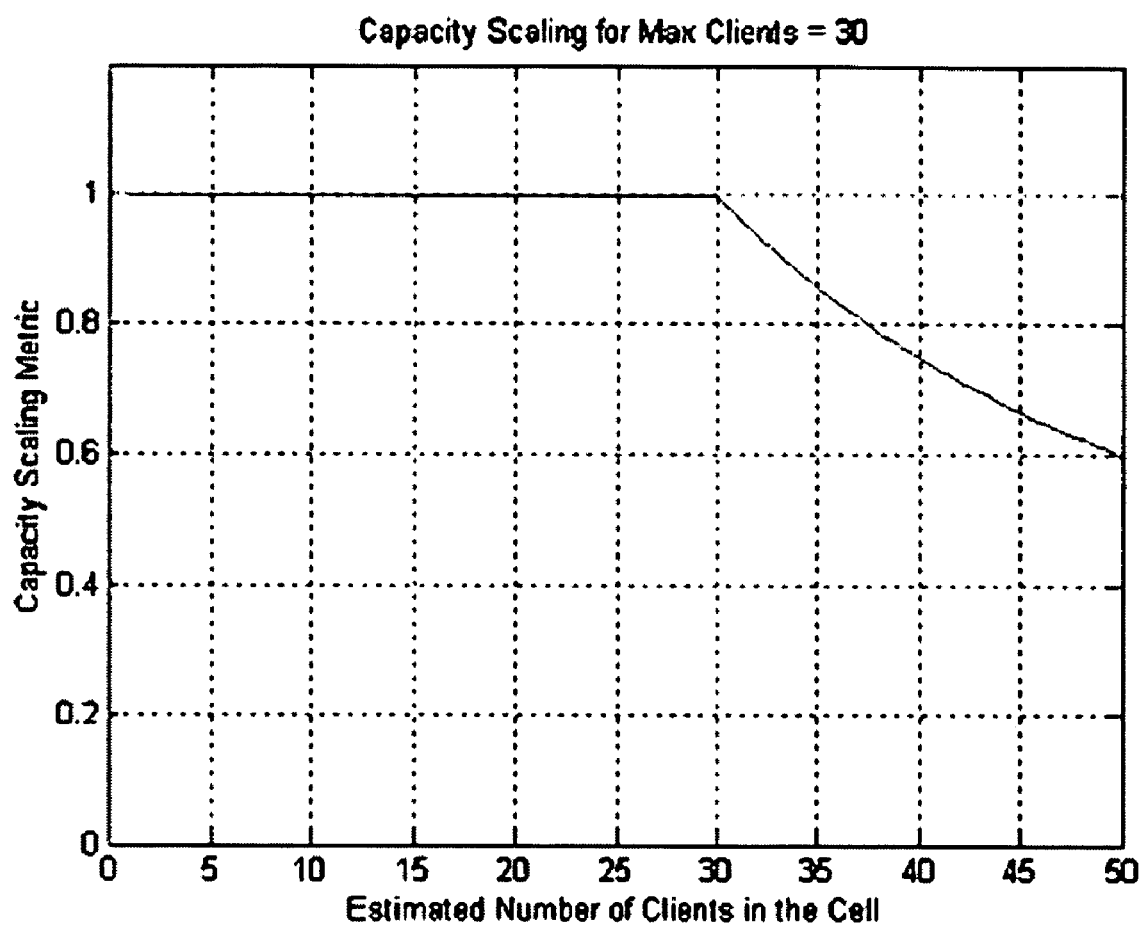
FIG. 12 depicts a cell loading metric used in evaluating a combined metric according to one embodiment of the present invention, and in particular.

FIG. 12 depicts how the cell loading factor varies as the number of client locations increases. When max_client location is set to 30, there is no penalty until the number of client locations exceeds 30. After that, the cell loading factor decreases proportionately to (1/number of client locations).

The Final Fine Power Sweep 209 in More Detail

Figure 13:
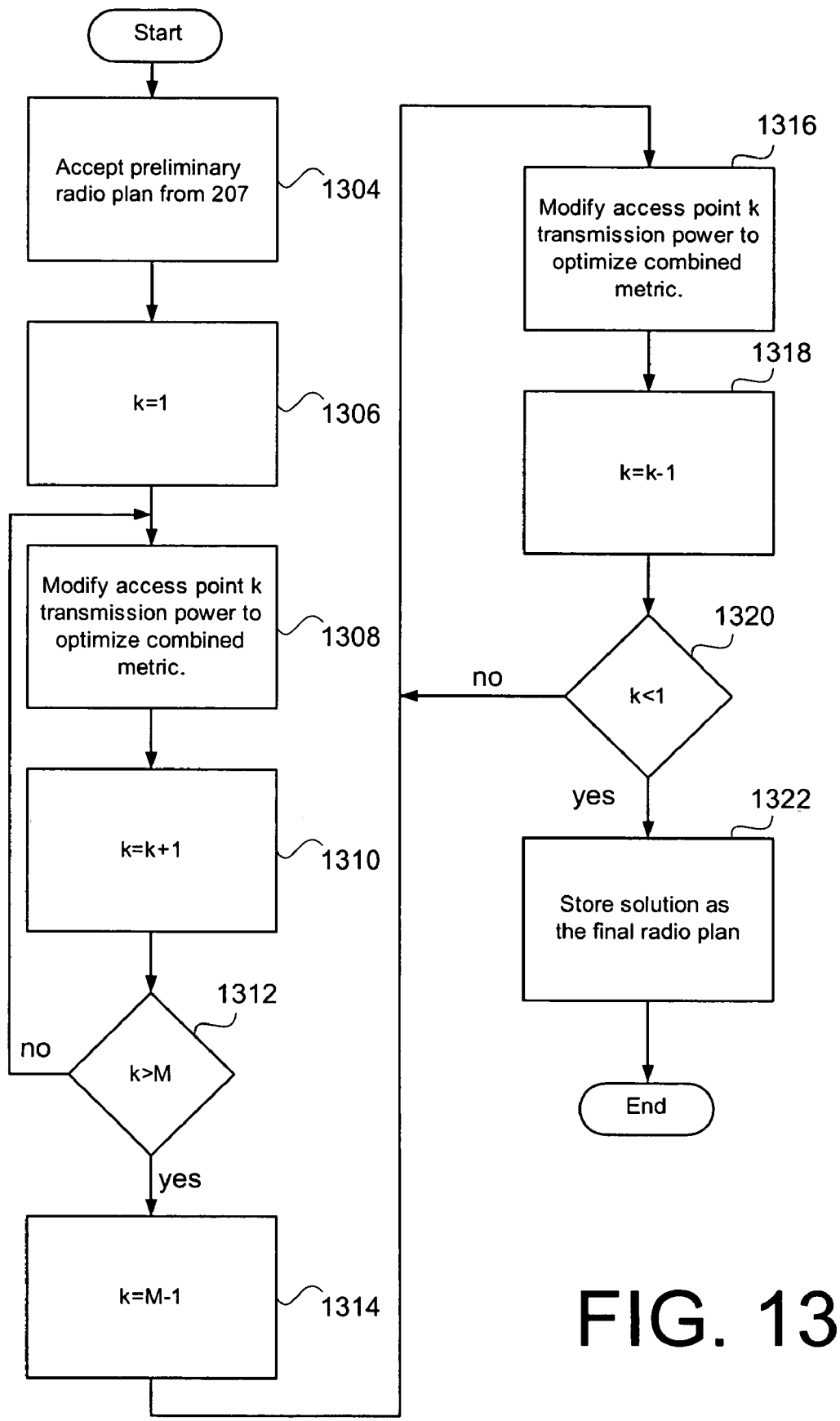
FIG. 13 shows a final power sweep that refines the power after the preliminary plan is determined, according to one embodiment of the invention.

A final fine power sweep is performed using the combined metric at step 209 of the flowchart of FIG. 2. Up until now, the power settings have been held the same for all the access points, but step 210 adjusts them individually. Further details of the fine power sweep will be described with reference to FIG. 13. In FIG. 13, a step 1304 accepts the preliminary frequency and power plans of 207. A step 1306 sets an index variable k to be equal to 1. The index variable k will identify a particular access point.

A step 1308 begins a loop. At step 1308, the transmit power of access point k is modified to optimize the combined metric value derived from all the access points. The access point k transmit power is varied starting at the initial value provided by the coarse power sweep solution. In one implementation, the execution of step 1308 is accelerated by searching for a local maximum as the access point k transmit power is modified. If as access point k transmit power varies, the combined metric value increases and then decreases, a local maximum is identified and it is assumed that this local maximum is the optimal value of access point k transmit power at this point in the algorithm.

A step 1310 increments the index variable k. Then a step 1312 tests whether k is greater than M. If k is greater than M, then execution returns to step 1308 to modify the transmit power of the next access point while retaining the modifications made in previous iterations. If k is not greater than M, then step 1314 is reached and the access points are stepped through again in reverse order.

A step 1316 modifies the access point k transmit power to optimize the combined metric as was done in step 1308. A step 1318 decrements the index variable k. A step 1320 tests whether all of the access points have been processed a second time by checking whether k is less than 1. If k is not less than 1, then processing returns to step 1316 to consider the next access point. If k is less than 1, then the solution is stored at step 1322 with all of the final individual access point power level modifications. Also, this particular solution is then removed from the set established in step 1302.

A wireless configuration server can then load the frequency and power assignments into the respective access points. Thereafter the wireless network operates in accordance with the selected configuration.

Thus methods have been described that provide rapid radio plans. The inventors have found that using the preliminary radio plan of 207 (see FIG. 2) yields solutions approx 92% as good as the those produced by a commercial implementation of the method described in U.S. application Ser. No. 10/933, 102 while determining the plan approximately 100 times faster. This is suitable as a quick solution for demonstration purposes.

Furthermore, including the final power plan sweep of 209 (see FIG. 2), the inventors have found that an implementation of the method yields solutions approximately 98% as good as the those produced by a commercial implementation of the method described in U.S. application Ser. No. 10/933,102 while determining the plan approximately 10 times faster.

It should be appreciated that although the invention has been described in the context of the IEEE 802.11 standard, the invention is not limited to such contexts and may be utilized in various other applications and systems. Aspects of the invention can be applied to other wireless networks, e.g., to networks conforming to other standards and for other applications, including, for example other WLAN standards and other wireless standards. Applications that can be accommodated include IEEE 802.11 wireless LANs and links, IEEE 802.16 wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

The methodologies described herein are, in one embodiment, performable by a machine which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/ or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory constitutes a carrier medium carrying machine readable code.

In alternative embodiments, the machine operates as a standalone device or may be connected, e.g., networked to other machines, in a networked deployment, the machine may operate in the capacity of a server or a client location machine in server-client location network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of WLAN manager. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, and volatile media. Non-volatile media includes, for example, optical, magnetic disks, and magneto-optical disks. Volatile media includes dynamic memory, such as main memory. For example, the term "carrier medium" shall accordingly be taken to included, but not be limited to, solid-state memories, and optical and magnetic media.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A computer-implemented method of operating a processing system to determine a power plan/frequency plan combination assigning transmit frequency channels and transmit powers for a plurality of managed access points (APs) of a wireless network, the method comprising:
   determining candidate power plans for the access points including determining candidate transmit powers for the access points;
   determining a candidate frequency plan corresponding to each of the determined candidate power plans using a frequency plan determining method to determine a set of candidate power plan/frequency plan combinations; and
   rating each combination of a candidate power plan and candidate frequency plan according to a first evaluation criterion, and selecting a preliminary power plan/frequency plan combination based on the rating.

2. A method as recited in claim 1, further comprising:
   determining a final power plan for the preliminary frequency plan of the preliminary power plan/frequency plan combination to obtain a final power plan/frequency plan combination.

3. A method as recited in claim 2, wherein the determining of the final power plan includes:
   setting the power and frequency according to the preliminary power plan/frequency plan combination;
   modifying transmit power of a given access point in the preliminary power plan/frequency plan combination assignment to optimize the first evaluation criterion;
   repeating the modifying of the transmit power for all of the access points in a first order; and
   repeating the modifying of the transmit power for all of the access points in a second order, the second order being the reverse of the first order.

4. A method as recited in claim 1, wherein the frequency plan determining method takes into account AP-to-AP interactions and does not take into account AP-to-client location-at-different-locations interactions.

5. A method as recited in claim 4, wherein the determining a frequency plan for the candidate power plan includes assigning frequency channels for a plurality of APs in parallel.

6. A method as recited in claim 5, wherein the frequency plan determining method includes accepting closeness information between the APs of the plurality, the closeness information using information about the path loss between pairs of the APs of the plurality.

7. A method as recited in claim 6, wherein the closeness information is for pairs of APs, sorted in order of closeness of the APs in the pair, and wherein the determining of the frequency plan starts with considering contention between the most critically-close APs, in terms of path loss, then considers the next-most close APs, and continues considering potential contentions in order of closeness of pairs of APs, each consideration leading to a further refinement of a set of possible frequency allocations, until a single frequency plan is determined, wherein at any point, each AP or group of APs is allowed to simultaneously have more than one possible frequency channel combination.

8. A method as recited in claim 7, wherein the closeness information is used to determine a measure of potential contention.

9. A method as recited in claim 8, wherein the measure of potential contention is the Fast Evaluation Metric (FEM).

10. A method as recited in claim 8, wherein the measure of potential contention is the Fast Evaluation Metric (FEM) determined by a FEM determining method that includes:
    accepting as input path loss information indicating path losses among pairs of the access points and frequency assignments for the access points;
    determining for each pair of access points whether they are likely to contend; and
    counting a number of contending pairs of access points to determine the FEM.

11. A method as recited in claim 10, wherein the determining for each pair of access points whether they are likely to contend includes ascertaining whether for the pair, a path loss between the pair of stations is exceeded by a threshold determined from a path loss threshold using a receiver sensitivity, and an adjacent channel rejection between a transmitting and receiving station, such adjacent channel rejection being zero for stations in the same frequency channel.

12. A method as recited in claim 7, wherein, if at any intermediate point in the considering of potential contentions, the number of possible frequency channel combinations is larger than a pre-selected threshold, the method includes considering potential contentions out of order to reduce the number of combinations in the set of possible frequency channel combinations.

13. A method as recited in claim 1, wherein the determining of the candidate transmit power plan for a selected access point includes for each of a set of data rates for the wireless network, setting the candidate transmit power to be the minimum AP transmit power for the AP such that a client location at any of a set of the selected AP's client locations in the area can successfully receive the selected APs transmissions, unless there is at least one of the set of client locations where successful reception is not possible.

14. A method as recited in claim 13, wherein in the case that there is at least one client location of the selected AP such that no successful reception is possible, the candidate transmit power is set to be the maximum power for the selected AP.

15. A method as recited in claim 1, wherein the determining of the candidate transmit power plans includes:
    accepting a set of path losses for each AP indicative of the path loss from the AP to each of a set of locations in the area, the set of locations forming a set of walkabout points;
    determining for each walkabout point which of the APs is the primary AP for the walkabout point, such that each AP's walkabout points of the set of walkabout points are known;
    determining the maximum path loss from each AP to any of the AP's walkabout points using the path loss data;
    for each of a set of data rates, accepting data indicative of the minimum signal strength at any station for successfully receiving data at the data rate;
    for each of a set of data rates, and for each AP at that data rate, determining the minimum transmit power necessary for the AP to successfully communicate with client locations at all of the AP's walkabout points, including, in the case that there is no transmit power at which the AP can successfully communicate to all its walkabout points, setting the minimum transmit power to be the maximum transmit power for the AP, the determining using the indicative data and the determined maximum path loss, such determined minimum transmit powers forming a set of potential candidate power plans; and
    removing duplicates from the potential candidate power plans to determine the candidate transmit power plans.

16. A method as recited in claim 1, wherein the first evaluation criterion takes into account both AP-to-AP interactions, and AP-to- client location-at-different-locations interactions.

17. A method as recited in claim 1, wherein the first evaluation criterion is the combined metric (CM).

18. A method as recited in claim 17, wherein the rating according to a first evaluation criterion includes determining the first evaluation criterion, wherein the determining of the first criterion includes:
accepting as input path loss information indicating path losses between a selected client location of the wireless network and the access points;
based on the path loss information, determining a capacity indicator that estimates communication impairment for the client location due to contention or collision;
based on the path loss information, determining a data rate indicator that estimates an achievable data rate for communication by a station at the selected client location;
determining a cell loading indicator that estimates communication impairment due to overloading of a cell occupied by station at the selected client location; and
based on the capacity indicator, the data rate indicator, and the cell loading indicator, determining a client location throughput.

19. A method as recited in claim 18, wherein determining the client location throughput includes multiplying the capacity indicator by the data rate indicator and the cell loading indicator.

20. A method as recited in claim 18, further comprising:
repeating the accepting as input of pass loss information, the determining of a capacity indicator, the determining of a data rate indicator, and the determining of a client location throughput for a plurality of client locations; and
determining the first criterion as a combined quality metric proportional to a reciprocal of an average of reciprocals of client location throughputs determined for a plurality of client locations.

21. A power plan determining method to assign transmit frequency powers for a plurality of access points (APs) of a wireless network, the power plan determining method part of a computer-implemented method of determining a power plan/frequency plan combination assigning transmit frequency channels and transmit powers for the plurality of APs, the power plan determining comprising:
accepting a set of data rates for the wireless network; and
for a selected access point, for each particular data rate of the accepted set of data rates, setting the transmit power to be the minimum AP transmit power for the AP such that a client location at any of a set of the selected AP's client locations in the area can successfully receive the selected APs transmissions, unless there is at least one of the set of client locations where successful reception is not possible,
wherein in the case that there is at least one client location of the selected AP such that no successful reception at the particular data rate is possible, the transmit power is set to be the maximum power for the selected AP.

22. A power plan determining comprising:
accepting a set of data rates for the wireless network;
for a selected access point, for each particular data rate of the accepted set of data rates, setting the transmit power to be the minimum AP transmit power for the AP such that a client location at any of a set of the selected AP's client locations in the area can successfully receive the selected APs transmissions, unless there is at least one of the set of client locations where successful reception is not possible;
accepting a set of path losses for each AP indicative of the path loss from the AP to each of a set of locations in the area, the set of locations forming a set of walkabout points;
determining for each walkabout point which of the APs is the primary AP for the walkabout point, such that each AP's walkabout points of the set of walkabout points are known;
determine the maximum path loss from each AP to any of the AP's walkabout points using the path loss data; and
for each of particular data rate, accepting data indicative of the minimum signal strength at any station for successfully receiving data at the particular data rate;
wherein the setting of the transmit power for the selected AP for each particular data rate of the set of data rates includes determining the minimum transmit power necessary for the selected AP to successfully communicate with client locations at all of the selected AP's walkabout points, including, in the case that there is no transmit power at which the selected AP can successfully communicate to all its walkabout points, setting the minimum transmit power to be the maximum transmit power for the selected AP, the determining using the indicative data and the determined maximum path loss, such determined minimum transmit powers forming a set of potential power plans; and removing duplicates from the potential power plans to determine the transmit power plan.

23. A frequency plan determining method to assign transmit frequency channels for a plurality of access points (APs) of a wireless network, the frequency plan determining method part of a computer-implemented method of determining a power plan/frequency plan combination assigning transmit frequency channels and transmit powers for the plurality of APs, the frequency plan determining comprising:
accepting a candidate power plan; and
determining a frequency plan for the candidate power plan, the frequency plan determining taking AP-to-AP interactions into account, and not taking into account AP-to-client location-at-different-locations interactions, the frequency plan using a measure of number of AP-AP contentions.

24. A frequency plan determining method as recited in claim 23, wherein the determining of a frequency plan for the candidate power plan includes assigning frequency channels for a plurality of APs in parallel.

25. A frequency plan determining method as recited in claim 24, further comprising accepting closeness information between the APs of the plurality, the closeness information using information about the path loss between pairs of the APs of the plurality.

26. A frequency plan determining method as recited in claim 25, wherein the closeness information is for pairs of APs, sorted in order of closeness of the APs in the pair, and wherein the determining of the frequency plan starts with considering contention between the most critically-close APs, in terms of path loss, then considering the next-most close APs, and continues considering potential contentions in order of closeness of pairs of APs, each consideration leading to a further refinement of a set of possible frequency allocations, until a single frequency plan is determined, wherein at any point, each AP or group of APs is allowed to simultaneously have more than one possible frequency channel combination.

27. A frequency plan determining method as recited in claim 26, wherein the closeness information is used to determine a measure of potential contention.

28. A frequency plan determining method as recited in claim 27, wherein the measure of potential contention is the Fast Evaluation Metric (FEM).

29. A frequency plan determining method as recited in claim 26, wherein, if at any intermediate point in the considering of potential contentions, the number of possible frequency channel combinations is larger than a pre-selected threshold, the method includes considering potential contentions out of order to reduce the number of combinations in the set of possible frequency channel combinations.

30. A computer-readable medium having stored thereon computer-readable code configured to cause one or more processors of a processing system to implement a method of determining a power plan/frequency plan combination assigning transmit frequency channels and transmit powers for a plurality of managed access points (APs) of a wireless network, the method comprising:
  determining candidate power plans for the access points including determining candidate transmit powers for the access points;
  determining a candidate frequency plan corresponding to each of the determined candidate power plans using a frequency plan determining method to determine a set of candidate power plan/frequency plan combinations; and
  rating each combination of a candidate power plan and candidate frequency plan according to a first evaluation criterion, and selecting a preliminary power planlfrequency plan combination based on the rating.

31. A computer-readable medium recited in claim 30, wherein the method further comprises:
  determining a final power plan for the preliminary frequency plan of the preliminary power plan/frequency plan combination to obtain a final power plan/frequency plan combination.

32. A computer-readable medium as recited in claim 31, wherein the determining of the final power plan includes:
  setting the power and frequency according to the preliminary power plan/frequency plan combination;
  modifying transmit power of a given access point in the preliminary power plan/frequency plan combination assignment to optimize the first evaluation criterion;
  repeating the modifying of the transmit power for all of the access points in a first order; and
  repeating the modifying of the transmit power for all of the access points in a second order, the second order being the reverse of the first order.

33. A computer-readable medium as recited in claim 30, wherein the frequency plan determining method takes into account AP-to-AP interactions and does not take into account AP-to-client location-at-different-locations interactions.

* * * * *